(12) United States Patent
Yang et al.

(10) Patent No.: US 11,917,945 B2
(45) Date of Patent: **\*Mar. 5, 2024**

(54) OUTDOOR MOVING DEVICE

(71) Applicant: Nanjing Chervon Industry Co., Ltd., Nanjing (CN)

(72) Inventors: Dezhong Yang, Nanjing (CN); Yangzi Liu, Nanjing (CN); Li Li, Nanjing (CN); Ju Li, Nanjing (CN); Changhai Lu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,817

(22) Filed: Feb. 17, 2023

(65) Prior Publication Data

US 2023/0202314 A1 Jun. 29, 2023

Related U.S. Application Data

(63) Continuation of application No. PCT/CN2022/098357, filed on Jun. 13, 2022.

(30) Foreign Application Priority Data

Jun. 25, 2021 (CN) .......................... 202110714441.8

(51) Int. Cl.
*A01D 69/00* (2006.01)
*A01D 34/00* (2006.01)
(Continued)

(52) U.S. Cl.
CPC ........... *A01D 69/02* (2013.01); *A01D 34/001* (2013.01); *A01D 34/64* (2013.01); *A01D 34/78* (2013.01);
(Continued)

(58) Field of Classification Search
CPC ..... B60L 50/66; B60L 2200/22; A01D 69/02; A01D 34/64; A01D 34/78
(Continued)

(56) References Cited

U.S. PATENT DOCUMENTS 3,732,671 A 5/1973 Allen
5,540,037 A 7/1996 Lamb et al.
(Continued)

FOREIGN PATENT DOCUMENTS

CN 102388720 A 3/2012
CN 102422750 A 4/2012
(Continued)

OTHER PUBLICATIONS

ISA/CN, Int. Search Report issued on PCT application No. PCT/CN2022/098357, dated Sep. 21, 2022, 5 pages.
(Continued)

*Primary Examiner* — Hau V Phan
(74) *Attorney, Agent, or Firm* — Greenberg Traurig, LLP

(57) ABSTRACT

An outdoor moving device includes a main body, a first energy storage device, a second energy storage device, and a connection assembly. The first energy storage device is capable of supplying power to the outdoor moving device and includes at least one first energy storage unit. The second energy storage device is capable of supplying power to the outdoor moving device and includes at least one second energy storage unit. The connection assembly is used for mounting the second energy storage device to the main body. The first energy storage device is detachably mounted to the main body, the first energy storage device is detachable from the main body to supply power to another power tool, the first energy storage unit includes a first positive (Continued)

electrode made of a first material, and the second energy storage unit includes a second positive electrode made of a second material.

20 Claims, 16 Drawing Sheets

(51) Int. Cl.

| | | |
|---|---|---|
| A01D 34/64 | (2006.01) | |
| A01D 34/78 | (2006.01) | |
| A01D 69/02 | (2006.01) | |
| B60L 50/60 | (2019.01) | |
| B60L 50/64 | (2019.01) | |
| B60L 53/53 | (2019.01) | |
| B60L 53/60 | (2019.01) | |
| B60L 58/18 | (2019.01) | |
| H01G 11/34 | (2013.01) | |
| H01M 10/42 | (2006.01) | |
| H01M 10/44 | (2006.01) | |
| H01M 10/46 | (2006.01) | |
| H01M 50/209 | (2021.01) | |
| H01M 50/213 | (2021.01) | |
| H01M 50/247 | (2021.01) | |
| H01M 50/249 | (2021.01) | |
| H01M 50/562 | (2021.01) | |
| H02J 7/00 | (2006.01) | |
| A01D 101/00 | (2006.01) | |
| H01M 10/052 | (2010.01) | |

(52) U.S. Cl.
CPC .............. *B60L 50/64* (2019.02); *B60L 50/66* (2019.02); *B60L 53/53* (2019.02); *B60L 53/60* (2019.02); *B60L 58/18* (2019.02); *H01G 11/34* (2013.01); *H01M 10/4221* (2013.01); *H01M 10/441* (2013.01); *H01M 10/46* (2013.01); *H01M 50/209* (2021.01); *H01M 50/213* (2021.01); *H01M 50/247* (2021.01); *H01M 50/249* (2021.01); *H01M 50/562* (2021.01); *H02J 7/0013* (2013.01); *H02J 7/0063* (2013.01); *A01D 2101/00* (2013.01); *B60L 2200/22* (2013.01); *B60L 2200/40* (2013.01); *H01M 10/052* (2013.01); *H01M 2220/20* (2013.01); *H01M 2220/30* (2013.01); *H02J 2207/20* (2020.01)

(58) Field of Classification Search
USPC ........................................................ 180/68.5
See application file for complete search history.

(56) References Cited

U.S. PATENT DOCUMENTS

| | | | |
|---|---|---|---|
| 5,934,053 | A | 8/1999 | Fillman |
| 6,591,593 | B1* | 7/2003 | Brandon ............... A01D 69/02 56/10.8 |
| 6,688,089 | B2 | 2/2004 | Velke |
| 6,826,895 | B2 | 12/2004 | Lida et al. |
| 6,856,895 | B2 | 2/2005 | Hashida |
| 7,392,869 | B2 | 7/2008 | Carlson |
| 7,578,116 | B1 | 8/2009 | Howell |
| 7,594,377 | B1 | 9/2009 | Jansen |
| 7,596,636 | B2 | 9/2009 | Gormley |
| 7,610,975 | B1 | 11/2009 | Gust |
| 7,610,986 | B2 | 11/2009 | Ohashi |
| 7,661,486 | B2 | 2/2010 | Turner |
| 7,673,712 | B2 | 3/2010 | Iida |
| 7,686,108 | B2 | 3/2010 | Piontek |
| 7,712,294 | B2 | 5/2010 | Wright |
| 7,721,517 | B2 | 5/2010 | Hunt |
| 7,731,398 | B2 | 6/2010 | Probasco |
| 7,735,592 | B2 | 6/2010 | Bellot |
| 8,429,885 | B2 | 4/2013 | Rosa |
| 9,210,839 | B2 | 12/2015 | Schygge |
| 9,282,695 | B2 | 3/2016 | Goto |
| 9,357,695 | B2* | 6/2016 | Higashikawa ......... A01D 34/00 |
| 9,535,695 | B2 | 1/2017 | Mylius |
| 9,867,331 | B1 | 1/2018 | Siudyla |
| 9,949,436 | B2 | 4/2018 | Ito |
| 10,093,169 | B1* | 10/2018 | Keller .................... H02K 7/14 |
| 10,098,278 | B2* | 10/2018 | Velderman ............ A01D 34/78 |
| 10,980,173 | B2 | 4/2021 | Becke et al. |
| 11,653,598 | B2 | 5/2023 | Liu |
| 2004/0050026 | A1 | 3/2004 | Heal et al. |
| 2006/0059879 | A1 | 3/2006 | Edmond |
| 2006/0059880 | A1 | 3/2006 | Angott |
| 2007/0125054 | A1 | 6/2007 | Dong et al. |
| 2008/0264026 | A1* | 10/2008 | Ishii .................... B60K 17/356 56/10.8 |
| 2012/0186887 | A1* | 7/2012 | Moriguchi ............. B60L 58/15 180/65.1 |
| 2013/0014966 | A1 | 1/2013 | Tozawa |
| 2013/0239533 | A1* | 9/2013 | Juenger ................ A01D 69/02 429/96 |
| 2014/0015451 | A1 | 1/2014 | Funabashi et al. |
| 2014/0144117 | A1 | 5/2014 | Schygge |
| 2014/0144177 | A1 | 5/2014 | Stallman |
| 2014/0165524 | A1 | 6/2014 | Schygge |
| 2014/0259804 | A1* | 9/2014 | Eavenson, Sr. ......... B60K 6/46 37/246 |
| 2015/0240773 | A1 | 8/2015 | Koenen et al. |
| 2015/0359174 | A1 | 12/2015 | Ito |
| 2016/0183451 | A1 | 6/2016 | Conrad |
| 2016/0242356 | A1 | 8/2016 | Verderman et al. |
| 2016/0338266 | A1 | 11/2016 | Yamaoka |
| 2017/0013780 | A1* | 1/2017 | Ito ........................ A01D 34/73 |
| 2017/0265381 | A1 | 9/2017 | Kuriyagawa |
| 2019/0075724 | A1 | 3/2019 | Becke et al. |
| 2019/0160972 | A1 | 5/2019 | Zeiler |
| 2020/0315095 | A1 | 10/2020 | Liu et al. |
| 2022/0408648 | A1 | 12/2022 | Yang |
| 2022/0408649 | A1 | 12/2022 | Yang |
| 2022/0410762 | A1 | 12/2022 | Yang |

FOREIGN PATENT DOCUMENTS

| | | |
|---|---|---|
| CN | 103053265 A | 4/2013 |
| CN | 103125212 A | 6/2013 |
| CN | 102422750 B | 7/2013 |
| CN | 103518487 A | 1/2014 |
| CN | 203423971 U | 2/2014 |
| CN | 103813918 A | 5/2014 |
| CN | 105850340 A | 8/2016 |
| CN | 206260323 U | 6/2017 |
| CN | 107205337 A | 9/2017 |
| CN | 109557910 A | 4/2019 |
| CN | 209710730 U | 12/2019 |
| DE | 212015000289 U1 | 7/2017 |
| EP | 2793346 | 10/2014 |
| EP | 2534938 B1 | 10/2015 |
| EP | 3219188 | 9/2017 |
| EP | 3079182 B1 | 9/2018 |
| FR | 2252802 B1 | 10/1976 |
| WO | 9520868 | 8/1995 |
| WO | 2013/102023 A1 | 7/2013 |
| WO | 2016074239 A1 | 5/2016 |
| WO | 2016/094475 A2 | 6/2016 |
| WO | 2016094475 A2 | 6/2016 |
| WO | 2016109860 A2 | 7/2016 |
| WO | 2017013602 A1 | 1/2017 |
| WO | 2017145093 A1 | 8/2017 |
| WO | 2017173944 A1 | 10/2017 |
| WO | 2018031719 A1 | 2/2018 |
| WO | 2018102338 A1 | 6/2018 |
| WO | 2020/147841 A1 | 7/2020 |

(56) References Cited

OTHER PUBLICATIONS

ISA/CN, English translation of Int. Search Report issued on PCT application No. PCT/CN2022/098357, dated Sep. 21, 2022, 4 pages.
ISA/CN, Written Opinion issued on PCT application No. PCT/CN2022/098357, dated Sep. 21, 2022, 3 pages.
ISA/CN, English translation of Written Opinion issued on PCT application No. PCT/CN2022/098357, dated Sep. 21, 2022, 3 pages.
ISA/CN, International Search Report issued on PCT application No. CN2018/123856, dated Mar. 22, 2019, 4 pages.
ISA/CN, English translation of International Search Report issued on PCT application No. CN2018/123856, dated Mar. 22, 2019, 2 pages.
ISA/CN, Written Opinion issued on PCT application No. CN2018/123856, dated Mar. 22, 2019, 3 pages.
ISA/CN, English translation of Written Opinion issued on PCT application No. CN2018/123856, dated Mar. 22, 2019, 4 pages.
EPO, extended European Search Report issued on European patent application No. 18894932.5, dated Dec. 8, 2020, 3 pages.
EPO, extended European Search Report issued on European patent publication No. 3827659A1, dated Aug. 24. 2021, 8 pages.
CIPO, office action issued on Canadian patent application No. 3,087,294, dated Sep. 26, 2022, 3 pages.
USPTO, non-final office action issued on U.S. Appl. No. 17/825,298, dated Aug. 5, 2022, 13 pages.
USPTO, non-final office action issued on U.S. Appl. No. 16/909,549, dated Jul. 8, 2022, 14 pages.
EPO, partial European search report issued on European patent application No. 22178263.4, dated Nov. 25, 2022, 11 pages.
Non-final Office Action from U.S. Appl. No. 18/191,590, dated Jun. 14, 2023, 11 pp.
Non-final Office Action from U.S. Appl. No. 18/191,698, dated Jun. 14, 2023, 13 pp.
Non-final Office Action from U.S. Appl. No. 18/191,776, dated Jun. 15, 2023, 11 pp.
Communication pursuant to Rule 114(2) EPC for EP application No. 22151071.2, dated May 12, 2023, 2 pp.
Office Action from Canadian application No. 3,165,100, dated Sep. 21, 2023, 10 pp.

* cited by examiner

OUTDOOR MOVING DEVICE

RELATED APPLICATION INFORMATION

This application is a continuation of International Application Number PCT/CN2022/098357, filed on Jun. 13, 2022, through which this application also claims the benefit under 35 U.S.C. § 119(a) of Chinese Patent Application No. 202110714441.8, filed on Jun. 25, 2021, which applications are incorporated herein by reference in their entirety.

BACKGROUND

Outdoor moving devices are used for working outdoors, such as a utility vehicle, an agricultural machinery vehicle, a farmer's vehicle, a dune buggy, a golf cart, and a riding mower. When working outdoors, these devices need to carry some energy storage devices. The energy storage devices of the outdoor moving devices may be basically divided into two types: energy storage devices using gasoline, diesel, and other fuels, and electrical energy storage devices. The electrical energy storage devices are more environmentally friendly and save more energy than the fuels and thus are more attractive to users and manufacturers in recent years.

However, the electrical energy storage device of an outdoor moving device generally uses a built-in and fixedly mounted stationary battery as an energy storage device. Such energy storage device limits the maximum energy storage capacity of the outdoor moving device. Especially for a professional user, the outdoor moving device has too single a function to satisfy the requirements of the professional user for working outdoors for a relatively long time and for various working contents.

For example, as a garden tool, the riding mower is widely applied to the fields including lawn and vegetation trimming. The professional user needs to trim lawns, branches, and weeds near shrubs and blow fallen leaves during working. The energy storage device carried by the riding mower cannot satisfy the electrical energy and operation requirements of the user who deals with too many affairs. However, if the riding mower is only provided with some detachable batteries that are relatively large in volume and relatively high in cost, the stored energy cannot satisfy the requirement of a large outdoor moving device working outdoors for a relatively long time.

It is to be noted that the content described in the background of the present application does not represent the related art completely.

SUMMARY

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; and a connection assembly for mounting the second energy storage device to the main body. The first energy storage device is detachably mounted to the main body, the first energy storage device is further configured to be detachable from the main body to supply power to another power tool, the first energy storage unit includes a first positive electrode made of a first material, and the second energy storage unit includes a second positive electrode made of a second material.

In an example, the outdoor moving device further includes a moving electric motor for driving the moving wheel set to rotate, where the first energy storage device is configured to be capable of supplying power to the moving electric motor, and the second energy storage device is also configured to be capable of supplying power to the moving electric motor.

In an example, total energy of the second energy storage device is greater than total energy of the first energy storage device.

In an example, the total energy of the second energy storage device is greater than or equal to 1 kWh and less than or equal to 30 kWh.

In an example, the first energy storage device includes at least one battery pack detachably mounted to the main body, where the battery pack includes a battery pack housing and multiple first energy storage units disposed in the battery pack housing.

In an example, an energy density of the second energy storage unit is different from an energy density of the first energy storage unit.

In an example, the outdoor moving device further includes an electrical connection assembly for electrically connecting the second energy storage device to the moving electric motor, where the connection assembly and the electrical connection assembly are separated from each other.

In an example, the outdoor moving device further includes a functional assembly for implementing a tool function and a drive electric motor for driving the functional assembly, where the second energy storage device is further configured to be capable of supplying power to the drive electric motor.

In an example, the outdoor moving device further includes a functional assembly for implementing a tool function and a drive electric motor for driving the functional assembly, where the second energy storage device is further configured to be capable of supplying power to the drive electric motor, and the first energy storage device is configured to not supply power to the drive electric motor.

In an example, a ratio of total energy of the second energy storage device to total energy of the first energy storage device is greater than or equal to 1 and less than or equal to 50.

In an example, a ratio of total energy of the second energy storage device to total energy of the first energy storage device is greater than or equal to 2 and less than or equal to 20.

In an example, the second energy storage device is fixedly mounted to the main body.

In an example, a ratio of a maximum lifetime of the second energy storage device when the outdoor moving device is in a load-free operation state to a maximum lifetime of the first energy storage device when the outdoor moving device is in the load-free operation state is greater than or equal to 1 and less than or equal to 50.

In an example, a ratio of an energy density of the second energy storage unit to an energy density of the first energy storage unit is greater than or equal to 0.3 and less than or equal to 1.

In an example, the second energy storage device is detachably mounted to the main body through an auxiliary tool.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; and a connection assembly for mounting the second energy storage device to the main body. The first energy storage device is detachably mounted to the main body, the first energy storage device is further configured to be detachable from the main body to supply power to another power tool, and total energy of the second energy storage device is greater than total energy of the first energy storage device.

A riding mower includes a housing; a seat mounted to the housing; a moving wheel set including moving wheels supporting the housing; a moving electric motor for driving the moving wheels to rotate; a mowing assembly including a mowing element for mowing grass; a drive electric motor for driving the mowing assembly to mow the grass; a first energy storage device configured to be capable of supplying power to the moving electric motor and including at least one first energy storage unit; and a second energy storage device configured to be capable of supplying power to the moving electric motor and including at least one second energy storage unit. The second energy storage device is mounted to the housing, the first energy storage device is detachably mounted to the housing, the first energy storage device is further configured to be detachable from the housing to supply power to another power tool, the first energy storage unit includes a first positive electrode made of a first material, and the second energy storage unit includes a second positive electrode made of a second material.

An outdoor moving vehicle includes a main body; a moving wheel set including front moving wheels and rear moving wheels that support the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit; and a connection assembly for mounting the second energy storage device to the main body. The first energy storage device is detachably connected to the main body, total energy of the second energy storage device is greater than or equal to 1 kWh and less than or equal to 30 kWh, and a distance between the second energy storage device and an axle of the rear moving wheels in a front and rear direction is greater than or equal to 0 cm and less than or equal to 100 cm.

In an example, the first energy storage device is disposed on an upper side of the second energy storage device.

In an example, the first energy storage device is disposed on a front side of the second energy storage device.

In an example, the first energy storage device is disposed on a rear side of the second energy storage device.

In an example, a groove is surrounded by the second energy storage device, and the first energy storage device is at least partially disposed in the groove.

In an example, a distance between a center of gravity of the second energy storage device and the axle of the rear moving wheels in an up and down direction is greater than or equal to 0 cm and less than or equal to 50 cm.

In an example, a distance between the second energy storage device and the first energy storage device in the front and rear direction is greater than or equal to 0 cm and less than or equal to 200 cm.

In an example, an energy density of the second energy storage unit is different from an energy density of the first energy storage unit.

In an example, the outdoor moving device further includes a functional assembly for implementing a tool function and a drive electric motor for driving the functional assembly, where the second energy storage device is further configured to be capable of supplying power to the drive electric motor.

An outdoor moving vehicle includes a main body; a moving wheel set including front moving wheels and rear moving wheels that support the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit; and a connection assembly for mounting the second energy storage device to the main body. The first energy storage device is detachably connected to the main body, total energy of the second energy storage device is greater than or equal to 1 kWh and less than or equal to 30 kWh, and a distance between the second energy storage device and an axle of the front moving wheels in a front and rear direction is greater than or equal to 0 cm and less than or equal to 100 cm.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; and a connection assembly for mounting the second energy storage device to the main body. The first energy storage device is detachably connected to the main body, total energy of the second energy storage device is greater than or equal to 1 kWh and less than or equal to 30 kWh, and the first energy storage device is disposed on an upper side of the second energy storage device.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; and a connection assembly for mounting the second energy storage device to the main body. The first energy storage device is detachably connected to the main body, total energy of the second energy storage device is greater than or equal to 1 kWh and less than or equal to 30 kWh, and the first energy storage device is disposed on a front side of the second energy storage device.

An outdoor moving vehicle includes a main body; a moving wheel set including front moving wheels and rear moving wheels that support the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit; and a connection assembly for mounting the second energy storage device to the main body. The first energy storage device is detachably connected to the main body, the first energy storage unit includes a first positive electrode made of a first material, the second energy storage unit includes a second positive electrode made of a second material, and a distance between the second energy storage device and an axle of the rear moving wheels in a front and rear direction is greater than or equal to 0 cm and less than or equal to 100 cm.

An outdoor moving vehicle includes a main body; a moving wheel set including front moving wheels and rear moving wheels that support the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit; and a connection assembly for mounting the second energy storage device to the main body. The first energy storage device is detachably connected to the main body, the first energy storage unit includes a first positive electrode made of a first material, the second energy storage unit includes a second positive electrode made of a second material, and a distance between the second energy storage device and an axle of the front moving wheels in a front and rear direction is greater than or equal to 0 cm and less than or equal to 100 cm.

An outdoor moving device includes a main body; a moving wheel set including moving wheels supporting the main body; a first energy storage device configured to be capable of supplying power to the outdoor moving device and including at least one first energy storage unit, where the first energy storage device is detachably mounted to the main body, and the first energy storage device is further configured to be detachable from the main body to supply power to another power tool; a second energy storage device configured to be capable of supplying power to the outdoor moving device and including at least one second energy storage unit, where total energy of the second energy storage device is greater than total energy of the first energy storage device; a charging unit connected to the second energy storage device and the first energy storage device; and a controller for controlling the charging unit such that the second energy storage device charges the first energy storage device.

In an example, the outdoor moving device further includes a charging interface for a connection to an external power supply, where the charging unit is electrically connected to the charging interface, and the controller is configured to control the charging unit such that the external power supply charges the second energy storage device through the charging interface.

In an example, the controller is configured to control the charging unit such that the external power supply charges the first energy storage device through the charging interface.

In an example, the outdoor moving device further includes a moving electric motor for driving the moving wheel set to rotate and a discharging unit, where the discharging unit is electrically connected to the second energy storage device and the moving electric motor so that the second energy storage device supplies power to the moving electric motor.

In an example, the discharging unit is electrically connected to the first energy storage device and the moving electric motor so that the first energy storage device supplies power to the moving electric motor.

In an example, the outdoor moving device further includes an electrical energy output port for outputting power to an external device, where the electrical energy output port is electrically connected to the first energy storage device or the second energy storage device.

In an example, the outdoor moving device further includes a functional assembly for implementing a tool function and a drive electric motor for driving the functional assembly, where the second energy storage device is further configured to be capable of supplying power to the drive electric motor.

In an example, the second energy storage device is fixedly connected to the main body.

A riding mower includes a main body; a seat mounted to the main body; a moving wheel set including moving wheels supporting the main body; a moving electric motor for driving the moving wheels to rotate; a mowing assembly including a mowing element for mowing grass; a drive electric motor for driving the mowing assembly to mow the grass; a first energy storage device configured to be capable of supplying power to the moving electric motor and including at least one first energy storage unit, where the first energy storage device is detachably mounted to the main body, and the first energy storage device is further configured to be detachable from the main body to supply power to another power tool; a second energy storage device configured to be capable of supplying power to the moving electric motor and including at least one second energy storage unit, where total energy of the second energy storage device is greater than total energy of the first energy storage device; a charging unit connected to the second energy storage device and the first energy storage device; and a controller for controlling the charging unit such that the second energy storage device supplies power to the first energy storage device.

An outdoor moving device includes a main body; a moving wheel set including moving wheels supporting the main body; a first energy storage device configured to be capable of supplying power to the outdoor moving device and including at least one first energy storage unit, where the first energy storage device is detachably mounted to the main body, and the first energy storage device is further configured to be detachable from the main body to supply power to another power tool; a second energy storage device configured to be capable of supplying power to the outdoor moving device and including at least one second energy storage unit; a charging unit connected to the second energy storage device and the first energy storage device; and a controller for controlling the charging unit such that the second energy storage device supplies power to the first energy storage device. The first energy storage unit includes a first positive electrode made of a first material and the second energy storage unit includes a second positive electrode made of a second material.

An outdoor moving device includes a main body; a moving wheel set including moving wheels supporting the main body; a first energy storage device configured to be capable of supplying power to the outdoor moving device and including at least one first energy storage unit, where the first energy storage unit includes a first positive electrode made of a first material, the first energy storage device is detachably mounted to the main body, and the first energy storage device is further configured to be detachable from the main body to supply power to another power tool; a second energy storage device configured to be capable of supplying power to the outdoor moving device and including at least one second energy storage unit, where the second energy storage unit includes a second positive electrode made of a second material; a discharging unit electrically connected to the second energy storage device and the first energy storage device and having a first discharge mode and a second discharge mode, where when the discharging unit is in the first discharge mode, one of the first energy storage device or the second energy storage device supplies power to the outdoor moving device and another one of the first energy storage device or the second energy storage device does not supply power to the outdoor moving device; and when the discharging unit is in the second discharge mode, the first energy storage device supplies power to the outdoor moving device and the second energy storage device also supplies power to the outdoor moving device; and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

In an example, maximum discharge power of the second energy storage device is greater than or equal to 5 kW and less than or equal to 200 kW.

In an example, maximum discharge power of the first energy storage device is greater than or equal to 1 kW and less than or equal to 10 kW.

In an example, the second energy storage device is fixedly mounted to the main body.

An outdoor moving device includes a main body; a moving wheel set including moving wheels supporting the main body; a first energy storage device configured to be capable of supplying power to the outdoor moving device and including at least one first energy storage unit, where the first energy storage device is detachably mounted to the main body, and the first energy storage device is further configured to be detachable from the main body to supply power to another power tool; a second energy storage device configured to be capable of supplying power to the outdoor moving device and including at least one second energy storage unit, where total energy of the second energy storage device is greater than total energy of the first energy storage device; a discharging unit electrically connected to the second energy storage device and the first energy storage device and having a first discharge mode and a second discharge mode, where when the discharging unit is in the first discharge mode, one of the first energy storage device or the second energy storage device supplies power to the outdoor moving device and another one of the first energy storage device or the second energy storage device does not supply power to the outdoor moving device; and when the discharging unit is in the second discharge mode, the second energy storage device supplies power to the outdoor moving device and the first energy storage device also supplies power to the outdoor moving device; and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

An outdoor moving device includes a main body; a moving wheel set including moving wheels supporting the main body; a first energy storage device configured to be capable of supplying power to the outdoor moving device and including at least one first energy storage unit, where the first energy storage device is detachably mounted to the main body, and the first energy storage device is further configured to be detachable from the main body to supply power to another power tool; a second energy storage device configured to be capable of supplying power to the outdoor moving device and including at least one second energy storage unit, where total energy of the second energy storage device is greater than total energy of the first energy storage device; a discharging unit electrically connected to the second energy storage device and the first energy storage device; and a controller electrically connected to the discharging unit. The discharging unit has a first discharge mode and a second discharge mode, where when the discharging unit is in the first discharge mode, the second energy storage device supplies power to the outdoor moving device and the first energy storage device does not supply power to the outdoor moving device; and when the discharging unit is in the second discharge mode, the first energy storage device supplies power to the outdoor moving device and the second energy storage device does not supply power to the outdoor moving device. The controller is configured to, when remaining power of the second energy storage device is greater than a preset value, control the discharging unit to be in the first discharge mode and when the remaining power of the second energy storage device is less than the preset value, control the discharging unit to be in the second discharge mode.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; a charging interface connected to an external power supply; and a charging unit electrically connected to the first energy storage device and the charging interface and electrically connected to the second energy storage device and the charging interface. The first energy storage device is detachably connected to the main body. A ratio of a maximum charge current at which the charging unit charges the second energy storage device to a maximum charge current at which the charging unit charges the first energy storage device is greater than or equal to 0.02 and less than or equal to 10.

In an example, the charging unit is configured to charge the first energy storage device to a preset state and then charge the second energy storage device.

In an example, the charging unit is configured to charge the second energy storage device to a first preset state and then charge the first energy storage device to a second preset state.

In an example, the charging unit is configured to continue charging the second energy storage device after charging the first energy storage device to the second preset state.

In an example, the second energy storage device is configured to be capable of charging the first energy storage device.

In an example, the maximum charge current at which the charging unit charges the first energy storage device is greater than or equal to 0.04 C and less than or equal to 4 C.

In an example, the maximum charge current at which the charging unit charges the second energy storage device is greater than or equal to 0.04 C and less than or equal to 4 C.

In an example, the outdoor moving device further includes a functional assembly for implementing a tool function and a drive electric motor for driving the functional assembly, where the second energy storage device is further configured to be capable of supplying power to the drive electric motor.

In an example, the outdoor moving device further includes a moving electric motor for driving the moving wheel set to rotate, where the second energy storage device is configured to be capable of supplying power to the moving electric motor, and the first energy storage device is configured to be capable of supplying power to the moving electric motor.

A riding mower includes a main body; a seat mounted to the main body; a moving wheel set including moving wheels supporting the main body; a moving electric motor for driving the moving wheels to rotate; a mowing assembly including a mowing element for mowing grass; a drive electric motor for driving the mowing assembly to mow the grass; a first energy storage device configured to be capable of supplying power to the moving electric motor and including at least one first energy storage unit; a second energy storage device configured to be capable of supplying power to the moving electric motor and including at least one second energy storage unit; a charging interface connected to an external power supply; and a charging unit electrically connected to the first energy storage device and the charging interface and electrically connected to the second energy storage device and the charging interface. The second energy storage device is fixedly connected to the main body, and the first energy storage device is detachably connected to the main body. A ratio of a maximum charge current at which the charging unit charges the second energy storage device to a maximum charge current at which the charging unit charges the first energy storage device is greater than or equal to 0.02 and less than or equal to 10.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit; a charging interface connected to an external power supply; and a charging unit electrically connected to the first energy storage device and the charging interface and electrically connected to the second energy storage device and the charging interface. The first energy storage device is detachably connected to the main body, the first energy storage unit includes a first positive electrode made of a first material, the second energy storage unit includes a second positive electrode made of a second material, and a ratio of a maximum charge current at which the charging unit charges the second energy storage device to a maximum charge current at which the charging unit charges the first energy storage device is greater than or equal to 0.02 and less than or equal to 10.

A tool system includes an outdoor moving device and an adapter. The outdoor moving device includes a main body; a moving wheel set including moving wheels supporting the main body; a first energy storage device configured to be capable of supplying power to the outdoor moving device and including at least one first energy storage unit, where the first energy storage device is coupled to the main body in a first mounting manner; a second energy storage device configured to be capable of supplying power to the outdoor moving device and including at least one second energy storage unit, where the second energy storage device is coupled to the main body in a second mounting manner different from the first mounting manner; and a charging circuit configured to be capable of being electrically connected to the first energy storage device and the second energy storage device to enable the second energy storage device to charge the first energy storage device. The first energy storage device is detachably mounted to the main body in the first mounting manner, the first energy storage device is configured to be detachable from the main body to supply power to another power tool, and the first energy storage device is further configured to be charged through the adapter after detached from the main body.

In an example, the second energy storage device is fixedly connected to the main body in the second mounting manner.

In an example, the second energy storage device is detachably connected to the main body through an auxiliary tool in the second mounting manner.

In an example, the main body includes a housing formed with a first accommodation cavity and a second accommodation cavity, where the first energy storage device is disposed in the first accommodation cavity and the second energy storage device is disposed in the second accommodation cavity.

In an example, the main body further includes a charging interface connectable to an external power supply, where the external power supply is capable of charging the first energy storage device and the second energy storage device through the charging interface.

In an example, total energy of the first energy storage device is greater than or equal to 100 Wh and less than or equal to 1500 Wh.

In an example, a ratio of total energy of the second energy storage device to total energy of the first energy storage device is greater than or equal to 1 and less than or equal to 50.

In an example, the outdoor moving device further includes a discharging unit electrically connected to the second energy storage device and the first energy storage device and having a first discharge mode and a second discharge mode, where when the discharging unit is in the first discharge mode, one of the first energy storage device or the second energy storage device supplies power to the outdoor moving device and another one of the first energy storage device or the second energy storage device does not supply power to the outdoor moving device, and when the discharging unit is in the second discharge mode, the second energy storage device supplies power to the outdoor moving device and the first energy storage device also supplies power to the outdoor moving device and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

In an example, the first energy storage unit includes a first positive electrode made of a first material and the second energy storage unit includes a second positive electrode made of a second material.

In an example, an energy density of the second energy storage unit is different from an energy density of the first energy storage unit.

In an example, the first energy storage device is disposed on an upper side of the second energy storage device.

In an example, the first energy storage device is disposed on a front side of the second energy storage device.

In an example, the first energy storage device is disposed on a rear side of the second energy storage device.

In an example, the outdoor moving device further includes a moving electric motor for driving the moving wheel set, where the first energy storage device is configured to be capable of supplying power to the moving electric motor, and the second energy storage device is configured to be capable of supplying power to the moving electric motor.

In an example, the first energy storage device includes a battery pack detachably mounted to the main body, the battery pack includes a battery pack interface, the main body is provided with a main body interface connectable to the battery pack interface, and the adapter is provided with an adapter interface connectable to the battery pack interface.

A tool system includes a riding mower and an adapter. The riding mower includes a main body including a frame, a seat mounted to the frame, an operating assembly for a user to operate, and a moving electric motor; a moving wheel set including moving wheels supporting the main body and configured to be capable of being driven by the moving electric motor; a first energy storage device configured to be capable of supplying power to the moving electric motor and including at least one first energy storage unit, where the first energy storage device is coupled to the main body in a first mounting manner; a second energy storage device configured to be capable of supplying power to the moving electric motor and including at least one second energy storage unit, where the second energy storage device is coupled to the main body in a second mounting manner different from the first mounting manner; and a charging circuit configured to be capable of being electrically connected to the first energy storage device and the second energy storage device to enable the second energy storage device to charge the first energy storage device. The first energy storage device is detachably mounted to the main body in the first mounting manner, the first energy storage device is configured to be detachable from the main body to supply power to another garden tool, and the first energy storage device is further configured to be charged through the adapter after detached from the main body.

In an example, the second energy storage device is fixedly connected to the main body in the second mounting manner.

In an example, the second energy storage device is detachably connected to the main body through an auxiliary tool in the second mounting manner.

In an example, the main body includes a housing formed with a first accommodation cavity and a second accommodation cavity, where the first energy storage device is disposed in the first accommodation cavity and the second energy storage device is disposed in the second accommodation cavity.

In an example, the main body further includes a charging interface connectable to an external power supply, where the external power supply is capable of charging the first energy storage device and the second energy storage device through the charging interface.

In an example, total energy of the first energy storage device is greater than or equal to 100 Wh and less than or equal to 1500 Wh.

In an example, a ratio of total energy of the second energy storage device to total energy of the first energy storage device is greater than or equal to 1 and less than or equal to 50.

In an example, the riding mower further includes a discharging unit electrically connected to the second energy storage device and the first energy storage device and having a first discharge mode and a second discharge mode, where when the discharging unit is in the first discharge mode, one of the first energy storage device or the second energy storage device supplies power to the riding mower and another one of the first energy storage device or the second energy storage device does not supply power to the riding mower, and when the discharging unit is in the second discharge mode, the second energy storage device supplies power to the riding mower and the first energy storage device also supplies power to the riding mower and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

In an example, the first energy storage unit includes a first positive electrode made of a first material and the second energy storage unit includes a second positive electrode made of a second material.

In an example, an energy density of the second energy storage unit is different from an energy density of the first energy storage unit.

In an example, the first energy storage device is disposed on an upper side of the second energy storage device.

In an example, the first energy storage device is disposed on a front side of the second energy storage device.

In an example, the first energy storage device is disposed on a rear side of the second energy storage device.

In an example, the first energy storage device includes a battery pack detachably mounted to the main body, the battery pack includes a battery pack interface, the main body is provided with a main body interface connectable to the battery pack interface, and the adapter is provided with an adapter interface connectable to the battery pack interface.

A tool system includes a riding mower and an adapter. The riding mower includes a main body including a frame, a seat mounted to the frame, an operating assembly for a user to operate, and a moving electric motor; a moving wheel set including moving wheels supporting the main body and configured to be capable of being driven by the moving electric motor; a first energy storage device configured to be capable of supplying power to the moving electric motor and including at least one first energy storage unit, where the first energy storage device is coupled to the main body in a first mounting manner; a second energy storage device configured to be capable of supplying power to the moving electric motor and including at least one second energy storage unit, where the second energy storage device is coupled to the main body in a second mounting manner different from the first mounting manner; and a charging circuit configured to be capable of being electrically connected to the first energy storage device and the second energy storage device to enable the second energy storage device to charge the first energy storage device. The first energy storage device is detachably mounted to the main body in the first mounting manner, the first energy storage device is configured to be detachable from the main body to supply power to another garden tool, and the first energy storage device is further configured to be charged through the adapter after detached from the main body.

In an example, the second energy storage device is fixedly connected to the main body in the second mounting manner.

In an example, the second energy storage device is detachably connected to the main body through an auxiliary tool in the second mounting manner.

In an example, the main body includes a housing formed with a first accommodation cavity and a second accommodation cavity, where the first energy storage device is disposed in the first accommodation cavity and the second energy storage device is disposed in the second accommodation cavity.

In an example, the main body further includes a charging interface connectable to an external power supply, where the external power supply is capable of charging the first energy storage device and the second energy storage device through the charging interface.

In an example, total energy of the first energy storage device is greater than or equal to 100 Wh and less than or equal to 1500 Wh.

In an example, a ratio of total energy of the second energy storage device to total energy of the first energy storage device is greater than or equal to 1 and less than or equal to 50.

In an example, the riding mower further includes a discharging unit electrically connected to the second energy storage device and the first energy storage device and having a first discharge mode and a second discharge mode, where when the discharging unit is in the first discharge mode, one of the first energy storage device or the second energy storage device supplies power to the riding mower and another one of the first energy storage device or the second energy storage device does not supply power to the riding mower, and when the discharging unit is in the second discharge mode, the second energy storage device supplies power to the riding mower and the first energy storage device also supplies power to the riding mower and a controller configured to, when voltages of the second energy storage device and the first energy storage device are different, control the discharging unit to be in the first discharge mode and when the voltages of the second energy storage device and the first energy storage device are the same, control the discharging unit to be in the second discharge mode.

In an example, the first energy storage unit includes a first positive electrode made of a first material and the second energy storage unit includes a second positive electrode made of a second material.

In an example, an energy density of the second energy storage unit is different from an energy density of the first energy storage unit.

In an example, the first energy storage device is disposed on an upper side of the second energy storage device.

In an example, the first energy storage device is disposed on a front side of the second energy storage device.

In an example, the first energy storage device is disposed on a rear side of the second energy storage device.

In an example, the first energy storage device includes a battery pack detachably mounted to the main body, the battery pack includes a battery pack interface, the main body is provided with a main body interface connectable to the battery pack interface, and the adapter is provided with an adapter interface connectable to the battery pack interface.

In an example, the first energy storage device is pluggably mounted to the main body in the first mounting manner and the second energy storage device is detachably mounted to the main body in the second mounting manner.

An outdoor tool device includes a main body; a first energy storage device configured to be capable of supplying power to the outdoor tool device and including at least one first energy storage unit; a second energy storage device configured to be capable of supplying power to the outdoor tool device and including at least one second energy storage unit; and a connection assembly for mounting the second energy storage device to the main body. The first energy storage device is detachably mounted to the main body, the first energy storage device is further configured to be detachable from the main body to supply power to another power tool, the first energy storage unit includes a first positive electrode made of a first material, and the second energy storage unit includes a second positive electrode made of a second material.

A riding mower includes a housing; a seat mounted to the housing; a moving wheel set including moving wheels supporting the housing; a moving electric motor for driving the moving wheels to rotate; a mowing assembly including a mowing element for mowing grass; a drive electric motor for driving the mowing assembly to mow the grass; a first energy storage device configured to be capable of supplying power to the moving electric motor or the drive electric motor; a second energy storage device configured to be capable of supplying power to the moving electric motor or the drive electric motor; and a controller configured to allow the riding mower to start when a sum of a capacity of the first energy storage device and a capacity of the second energy storage device is greater than or equal to 10 Ah.

In an example, the controller is configured to, when the capacity of the first energy storage device is greater than or equal to 10 Ah, control the riding mower to start.

In an example, the second energy storage device is mounted to a housing, the first energy storage device is detachably mounted to the housing, and the first energy storage device is further configured to be detachable from the housing to supply power to another power tool.

In an example, a full voltage of the first energy storage device is greater than a full voltage of the second energy storage device.

In an example, a temperature characteristic of the first energy storage device is different from a temperature characteristic of the second energy storage device.

In an example, the first energy storage device includes a first energy storage unit including a first positive electrode made of a first material, and the second energy storage device includes a second energy storage unit including a second positive electrode made of a second material.

A riding mower includes a housing; a seat mounted to the housing; a moving wheel set including moving wheels supporting the housing; a moving electric motor for driving the moving wheels to rotate; a mowing assembly including a mowing element for mowing grass; a drive electric motor for driving the mowing assembly to mow the grass; an energy storage device configured to be capable of supplying power to the moving electric motor or the drive electric motor and including a lithium iron phosphate battery; and a controller configured to, when a capacity of the energy storage device is greater than or equal to 10 Ah, allow the riding mower to start.

A riding lawn mower includes a housing; a seat mounted to the housing; a moving wheel set including moving wheels supporting the housing; a moving electric motor for driving the moving wheels to rotate; a mowing assembly including a mowing element for mowing grass; and a drive electric motor for driving the mowing assembly to mow the grass. The housing is formed with a first mounting portion and a second mounting portion, where the first mounting portion is used for mounting a first energy storage device configured to be capable of supplying power to the moving electric motor or the drive electric motor, and the second mounting portion is used for mounting a second energy storage device configured to be capable of supplying power to the moving electric motor or the drive electric motor. A controller is configured to, when a sum of a capacity of the first energy storage device in the first mounting portion and a capacity of the second energy storage device in the second mounting portion is greater than or equal to 10 Ah, allow the riding mower to start.

In an example, the first mounting portion or the second mounting portion is an accommodation cavity or a mounting surface or a mounting groove formed by the housing.

In an example, the first mounting portion is disposed on an upper side of the second mounting portion.

In an example, the first mounting portion is disposed on a front side of the second mounting portion.

In an example, the first mounting portion is disposed on a rear side of the second mounting portion.

In an example, the first energy storage device includes at least one first energy storage unit, and the second energy storage device includes at least one second energy storage unit, where the first energy storage unit includes a first positive electrode made of a first material, and the second energy storage unit includes a second positive electrode made of a second material.

An outdoor moving device includes a main body; a moving wheel set including moving wheels supporting the main body; a moving electric motor for driving the moving wheel set to rotate; a first energy storage device including at least one first energy storage unit; a second energy storage device including at least one second energy storage unit; a connection assembly for mounting the second energy storage device to the main body; a discharging unit electrically connected to the first energy storage device and the moving electric motor so that the first energy storage device supplies power to the moving electric motor and electrically connected to the second energy storage device and the moving electric motor so that the second energy storage device supplies power to the moving electric motor; and a controller configured to, when a voltage of the at least one first energy storage unit is less than or equal to a first voltage threshold, control the discharging unit to limit power supply from the first energy storage device and when a voltage of the at least one second energy storage unit is less than or equal to a second voltage threshold, control the discharging unit to limit power supply from the second energy storage device. The first energy storage device is detachably mounted to the main body, the first energy storage device is further configured to be detachable from the main body to supply power to another power tool, and a difference between the second voltage threshold and the first voltage threshold is less than or equal to 1 V.

In an example, the difference between the second voltage threshold and the first voltage threshold is less than or equal to 0.5 V.

In an example, the controller is configured to, when half of a voltage of two of the at least one first energy storage unit is less than or equal to the first voltage threshold, control the discharging unit to limit the power supply from the first energy storage device.

In an example, the controller is configured to, when half of a voltage of one of the at least one first energy storage unit is less than or equal to the first voltage threshold, control the discharging unit to limit the power supply from the first energy storage device.

In an example, the controller is configured to, when half of a voltage of one of the at least one second energy storage unit is less than or equal to the first voltage threshold, control the discharging unit to limit the power supply from the second energy storage device.

In an example, the first energy storage device includes the at least one first energy storage unit, and the second energy storage device includes the at least one second energy storage unit, where the first energy storage unit includes a first positive electrode made of a first material, and the second energy storage unit includes a second positive electrode made of a second material.

An outdoor moving device includes a main body; a moving wheel set including moving wheels supporting the main body; a moving electric motor for driving the moving wheel set to rotate; a first energy storage device including at least one first energy storage unit; a second energy storage device including at least one second energy storage unit; a discharging unit electrically connected to the first energy storage device and the moving electric motor so that the first energy storage device supplies power to the moving electric motor and electrically connected to the second energy storage device and the moving electric motor so that the second energy storage device supplies power to the moving electric motor; and a controller configured to, when a voltage of the at least one first energy storage unit is less than or equal to a first voltage threshold, control the discharging unit to limit power supply from the first energy storage device and when a voltage of the at least one second energy storage unit is less than or equal to a second voltage threshold, control the discharging unit to limit power supply from the second energy storage device. The controller dynamically decreases the first voltage threshold or the second voltage threshold when a discharge current of the discharging unit increases.

An outdoor moving device includes a main body; a moving wheel set including moving wheels supporting the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit, where total energy of the second energy storage device is greater than total energy of the first energy storage device; and a controller configured to, when a discharge current of the first energy storage device is greater than or equal to a first current threshold, limit power supply from the first energy storage device.

In an example, the controller is configured to, when a discharge current of the second energy storage device is greater than or equal to a second current threshold, limit power supply from the second energy storage device, where the first current threshold is less than or equal to the second current threshold.

In an example, the first energy storage unit includes a first positive electrode made of a first material and the second energy storage unit includes a second positive electrode made of a second material.

In an example, the controller is configured to limit the power supply from the first energy storage device when a Joule integral value of the discharge current of the first energy storage device over a preset time period is greater than the first current threshold.

In an example, a preset time period is greater than or equal to 3 s and less than or equal to 120 s.

In an example, the controller is configured to limit power of the moving electric motor when the discharge current of the first energy storage device is greater than or equal to the first current threshold.

In an example, the total energy of the second energy storage device is greater than or equal to 1 kWh and less than or equal to 30 kWh.

In an example, a ratio of the total energy of the second energy storage device to the total energy of the first energy storage device is greater than or equal to 1 and less than or equal to 50.

In an example, a ratio of the total energy of the second energy storage device to the total energy of the first energy storage device is greater than or equal to 2 and less than or equal to 20.

An outdoor moving device includes a main body; a moving wheel set including moving wheels supporting the main body; a moving electric motor for driving the moving wheel set to rotate; a first energy storage device configured to be capable of supplying power to the moving electric motor and including at least one first energy storage unit, where the first energy storage unit includes a first positive electrode made of a first material; and a second energy storage device configured to be capable of supplying power to the moving electric motor and including at least one second energy storage unit, where the second energy storage unit includes a second positive electrode made of a second material. A difference between a full voltage of the first energy storage unit and a full voltage of the second energy storage unit is less than or equal to 1 V.

In an example, the difference between the full voltage of the first energy storage unit and the full voltage of the second energy storage unit is less than or equal to 0.5 V.

An outdoor moving device includes a main body; a moving wheel set including moving wheels supporting the main body; a first energy storage device configured to be capable of supplying power to the outdoor moving device and including at least one first energy storage unit; a second energy storage device configured to be capable of supplying power to the outdoor moving device and including at least one second energy storage unit, where a full voltage of the second energy storage device is less than a full voltage of the first energy storage device; a charging interface connected to an external power supply; a charging unit electrically connected to the first energy storage device and the charging interface and electrically connected to the second energy storage device and the charging interface; and a controller for controlling the charging unit such that the external power supply charges the first energy storage device and the second energy storage device through the charging interface. The controller is configured to, when the second energy storage device is charged to basically the full voltage, control the charging unit to perform charge equalization on the second energy storage device.

In an example, the charging unit includes a charging circuit and an equalization circuit, where the charging circuit includes at least a first charging branch connected to the first energy storage device and a second charging branch connected to the second energy storage device, and the equalization circuit is connected to the second energy storage device.

In an example, the controller is configured to, when the second energy storage device is basically charged to the full voltage, control the second charging branch to be turned off and control the equalization circuit to be turned on, so as to perform the charge equalization on the second energy storage device.

In an example, the equalization circuit includes a constant current device capable of receiving a current from the charging interface, converting the current into a constant current, and outputting the constant current to the second energy storage device.

In an example, the equalization circuit further includes an equalization switch connected to the controller, where the controller is configured to, when the second energy storage device is basically charged to the full voltage, control the equalization switch to be turned on and control the second charging branch to be turned off, so as to perform the charge equalization on the second energy storage device.

An outdoor moving device includes a main body; a moving wheel set including moving wheels supporting the main body; a moving electric motor for driving the moving wheel set to rotate; a first energy storage device configured to be capable of supplying power to the moving electric motor and including multiple first energy storage units, where each of the multiple first energy storage units includes a first positive electrode made of a first material; a second energy storage device configured to be capable of supplying power to the moving electric motor and including multiple second energy storage units, where each of the multiple second energy storage units includes a second positive electrode made of a second material; a charging interface connected to an external power supply; a charging unit electrically connected to the first energy storage device and the charging interface and electrically connected to the second energy storage device and the charging interface; and a controller for controlling the charging unit such that the external power supply charges the first energy storage device and the second energy storage device through the charging interface. The controller is configured to control the charging unit to perform charge equalization on at least the second energy storage device.

In an example, a bus electrically connected between the charging interface and the charging unit is further included.

In an example, the charging unit includes a charging circuit and an equalization circuit that are connected in parallel.

In an example, the charging circuit includes two charging branches, where the first energy storage device and the second energy storage device are separately connected to different charging branches and both connected to the same equalization circuit.

In an example, the equalization circuit includes two equalization branches, where the first energy storage device and the second energy storage device are separately connected to different equalization branches.

In an example, the equalization circuit includes a constant current device capable of receiving a current from the charging interface, converting the current into a constant current, and outputting the constant current to the energy storage devices.

In an example, the equalization circuit further includes an equalization switch connected to the controller, where the controller is configured to control the equalization switch to be turned on and control at least the charging circuit connected to the second energy storage device to be turned off, so as to perform the charge equalization on the second energy storage device.

In an example, an equalization branch switch is disposed on each of the two equalization branches, and the controller is configured to control the equalization branch switch to be turned on, so as to perform the charge equalization on an energy storage device connected to the each of the two equalization branches.

In an example, the second material includes lithium iron phosphate.

In an example, a full voltage of the second energy storage device is 50 V to 60 V.

In an example, a full voltage of the second energy storage device is lower than a full voltage of the first energy storage device.

In an example, the second energy storage device is fully charged earlier than the first energy storage device.

An outdoor moving device includes a main body; a moving wheel set including moving wheels supporting the main body; a moving electric motor for driving the moving wheel set to rotate; an energy storage device configured to be capable of supplying power to the moving electric motor and including multiple energy storage units; a charging interface connected to an external power supply; and a charging unit electrically connected to the energy storage device and the charging interface and including a charging circuit and an equalization circuit. The equalization circuit includes a constant current device capable of receiving a charge current from the charging interface, converting the charge current into a constant current, and outputting the constant current to the energy storage device.

In an example, the constant current is greater than or equal to 20 mA and less than or equal to 50 mA.

In an example, the charge current from the charging interface is greater than or equal to 0.1 C and less than or equal to 2 C.

In an example, the charging circuit includes multiple charging branches, where energy storage devices are separately connected to different charging branches and connected to the same equalization circuit.

In an example, the equalization circuit includes multiple equalization branches, where different energy storage devices are separately connected to different equalization branches.

In an example, each equalization branch includes one equalization branch switch, where a controller is configured to control at least a charging branch connected to the energy storage device to be turned off and control an equalization branch switch connected to the energy storage device to be turned on, so as to perform charge equalization on the energy storage device.

In an example, each of the multiple energy storage units is connected in one control loop and when the one control loop is cut off, the each of the multiple energy storage units is capable of receiving electrical energy inputted by the charging unit.

An outdoor moving device includes a main body; a moving wheel set including moving wheels supporting the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit, where total energy of the second energy storage device is greater than total energy of the first energy storage device; a charging unit electrically connected to the first energy storage device and the moving electric motor and electrically connected to the second energy storage device and the moving electric motor; and a controller configured to, when a rotational speed of the moving electric motor decreases and power of the second energy storage device is less than or equal to a power threshold, control the charging unit such that a current generated by the moving electric motor is outputted to the second energy storage device.

In an example, the first energy storage unit includes a first positive electrode made of a first material and the second energy storage unit includes a second positive electrode made of a second material.

In an example, the controller is configured to, when the rotational speed of the moving electric motor decreases and the power of the second energy storage device is greater than the power threshold, control the charging unit such that the current generated by the moving electric motor is outputted to one of the first energy storage device or the second energy storage device which has a lower voltage.

In an example, a service life of the second energy storage unit is greater than a service life of the first energy storage unit.

In an example, the power threshold is 80% of total power of the second energy storage device.

In an example, the total energy of the second energy storage device is greater than or equal to 1 kWh and less than or equal to 30 kWh.

An outdoor moving device includes a main body; a moving wheel set including moving wheels supporting the main body; a moving electric motor for driving the moving wheel set to rotate; a first energy storage device configured to be capable of supplying power to the moving electric motor and including at least one first energy storage unit; a second energy storage device configured to be capable of supplying power to the moving electric motor and including at least one second energy storage unit, where total energy of the second energy storage device is greater than total energy of the first energy storage device; a charging unit electrically connected to the first energy storage device and the moving electric motor and electrically connected to the second energy storage device and the moving electric motor; and a controller configured to, when a rotational speed of the moving electric motor decreases, control the charging unit according to at least power or a voltage of the first energy storage device or the second energy storage device such that a current generated by the moving electric motor is outputted to the first energy storage device or the second energy storage device.

In an example, the controller is configured to, when the rotational speed of the moving electric motor decreases, control the charging unit such that the current generated by the moving electric motor is outputted to one of the first energy storage device or the second energy storage device which has lower power.

In an example, the controller is configured to, when the rotational speed of the moving electric motor decreases, control the charging unit such that the current generated by the moving electric motor is outputted to one of the first energy storage device or the second energy storage device which has a lower voltage.

In an example, the total energy of the second energy storage device is greater than or equal to 1 kWh and less than or equal to 30 kWh.

DETAILED DESCRIPTION

The present application is described below in detail in conjunction with drawings and examples.

It is to be understood by those skilled in the art that in the description of the present application, orientations or position relations indicated by terms such as "up", "down", "front", "rear", "left", and "right" are based on the drawings. These orientations or position relations are intended only to facilitate and simplify the description of the present application and not to indicate or imply that a device or element referred to must have such particular orientations or must be configured or operated in such particular orientations. Thus, the terms are not to be construed as limiting the present application.

The present application is described below in detail in conjunction with drawings and examples.

Figure 1:
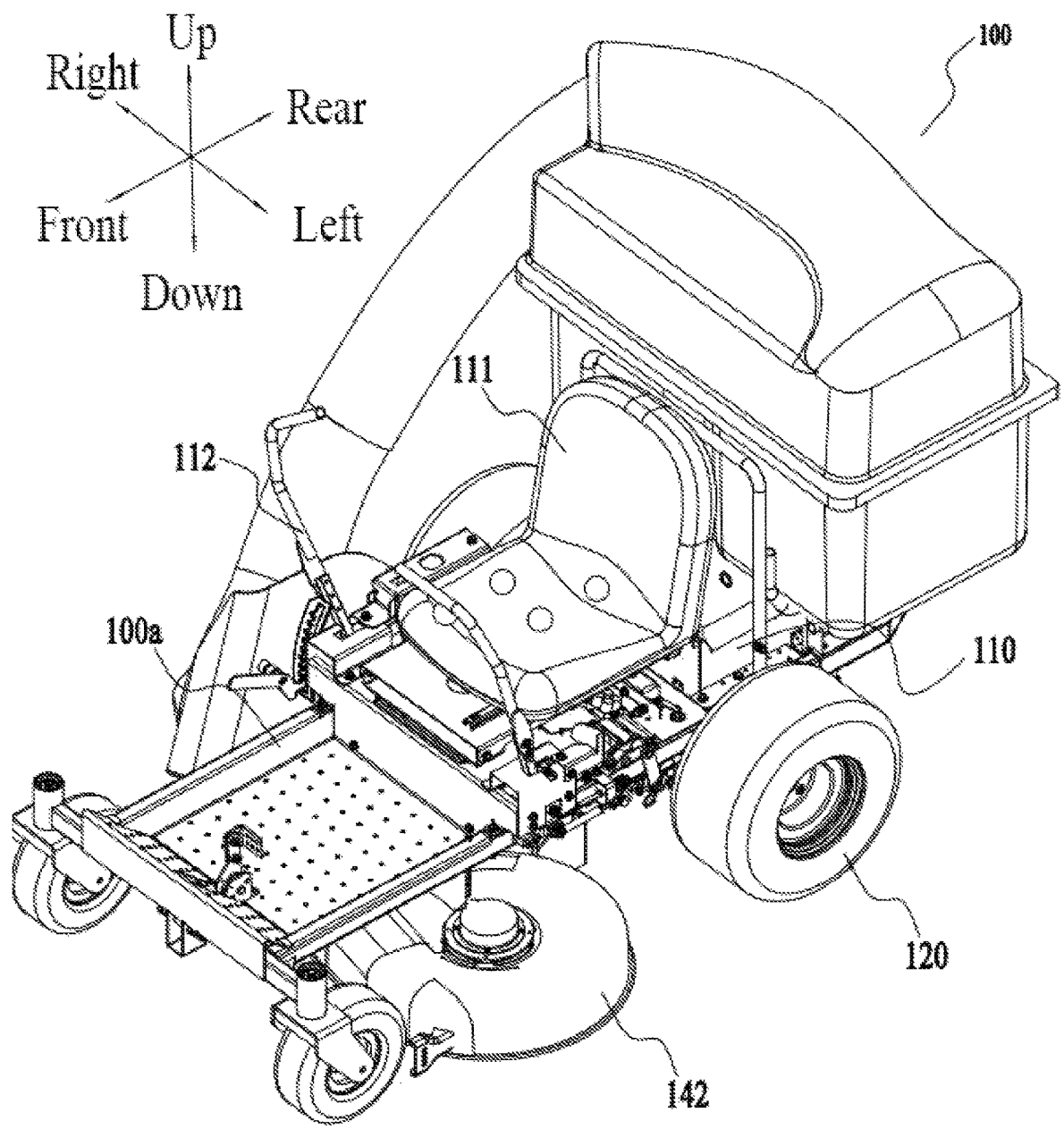
FIG. 1 is a perspective view of an outdoor moving device according to an example of the present application.

Referring to FIG. 1, the present application provides an outdoor tool device and, in particular, an outdoor moving device 100. The outdoor moving device 100 is specifically a riding mower capable of moving and mowing outdoors. It is to be understood that the outdoor moving device may be another vehicle that only moves outdoors, such as a utility vehicle shown in FIG. 20, or may be a dune buggy, a farmer's vehicle, a golf cart, or the like. The outdoor moving device may also be a vehicle which, like the riding mower shown in this example, can implement another function in addition to a moving function, such as a snow thrower shown in FIG. 19. The snow thrower can move outdoors and implement a snow throwing function. The outdoor moving device may also be an agricultural machinery vehicle, such as a harvester and a pesticide spraying vehicle. Of course, it is to be understood that the outdoor tool device may also be a washer shown in FIG. 21.

In fact, any outdoor moving device that adopts the essence of the technical solutions of the present application described below belongs to the protection scope of the present application.

Figure 2:
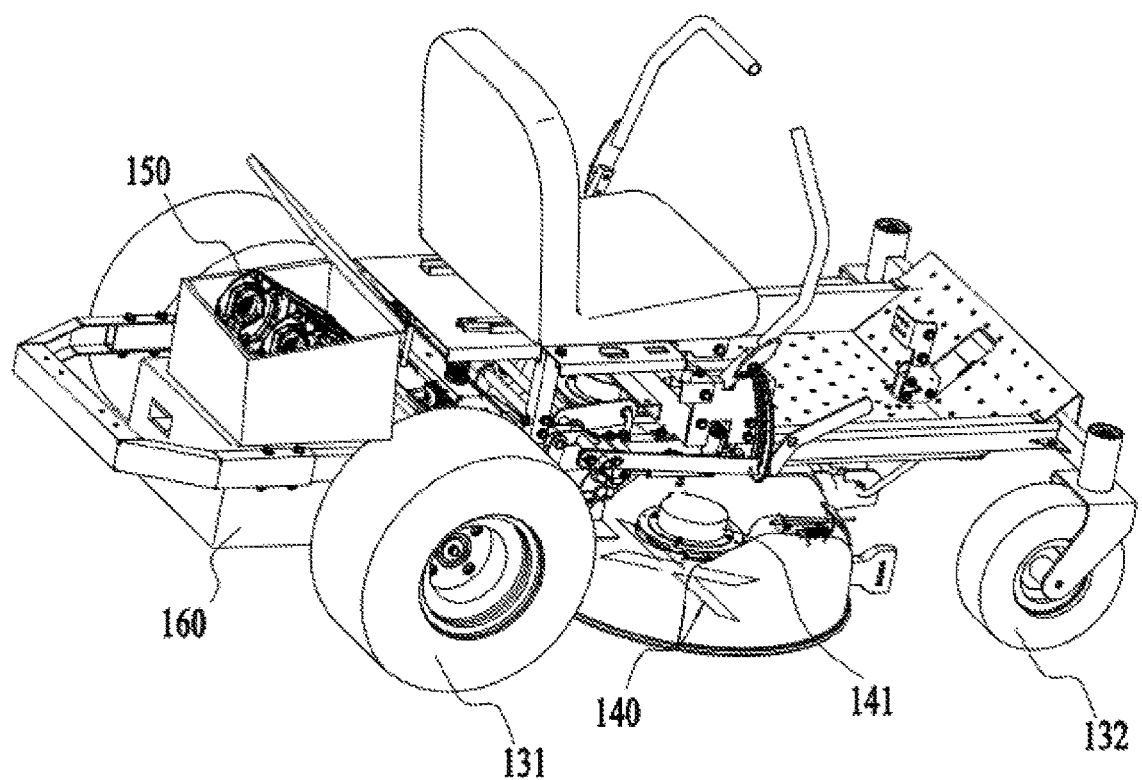
FIG. 2 is a perspective view illustrating part of a structure of the outdoor moving device in FIG. 1.
Figure 3A:
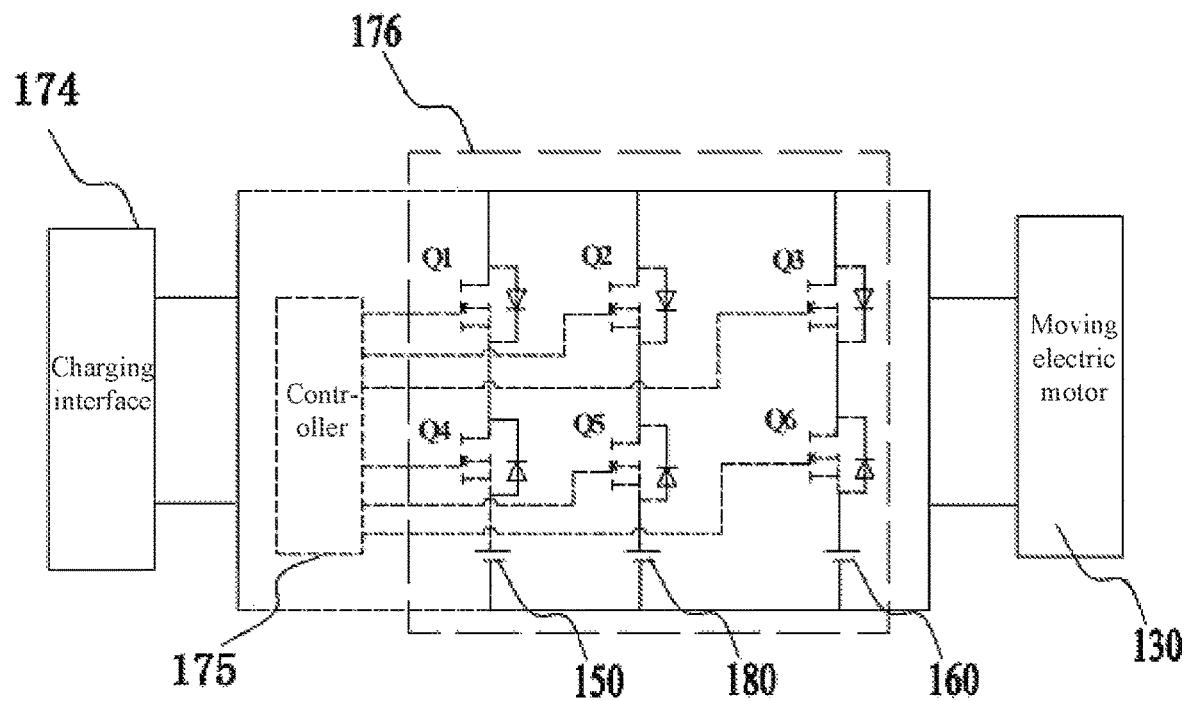
FIG. 3A is a circuit diagram of the outdoor moving device in FIG. 1.

As shown in FIGS. 1 to 3, the outdoor moving device 100 includes a main body 100a and a moving wheel set 120. The main body 100a further includes a housing 110 and a moving electric motor 130. The moving wheel set 120 is connected to the main body 100a to support the main body 100a. The moving wheel set 120 can drive the outdoor moving device 100 to move at least along a front and rear direction. The moving wheel assembly 120 includes rear moving wheels 131 and front moving wheels 132. The moving electric motor 130 drives the rear moving wheels 131 or the front moving wheels 132 to rotate so that the outdoor moving device 100 can move on the ground. Two moving electric motors 130 may be provided, and the two moving electric motors 130 separately drive two rear moving wheels 131 so that the outdoor moving device 100 can turn in other directions deviating from the front and rear direction.

The outdoor moving device 100 further includes a functional assembly 140 for implementing a tool function and a drive electric motor 141 for driving the functional assembly 140. In this example, the outdoor moving device 100 is the riding mower, the functional assembly 140 is specifically a mowing assembly including a mowing element for mowing lawns, and the drive electric motor 141 drives the mowing element to rotate.

Referring to FIG. 1, the outdoor moving device 100 can be used for a user to ride on. The user may control the outdoor moving device 100 to move and operate the outdoor moving device 100 to trim lawns and vegetation at the same time. The outdoor moving device 100 further includes a seat 111 on which the user sits. The seat 111 is mounted to the housing 110 and used for the user to sit on. In this example, the riding mower includes an operating assembly, where the operating assembly is specifically an operating rod assembly 112 that is operable by the user to control the riding mower to move forwards, move backwards, and turn.

Referring to FIG. 2, the outdoor moving device 100 further includes a first energy storage device 150 and a second energy storage device 160, where both the first energy storage device 150 and the second energy storage device 160 can supply power to the outdoor moving device 100. As shown in FIGS. 2 to 6, the first energy storage device 150 includes at least one first energy storage unit 151. The second energy storage device 160 includes at least one second energy storage unit 161. The first energy storage device 150 is connected to the housing 110 in a first mounting manner so that the first energy storage device 150 is detachably mounted to the housing 110 in the first mounting manner. For example, in this example, the first energy storage device 150 includes a battery pack 152 that is detachably mounted to the housing 110. The second energy storage device 160 is connected to the housing 110 in a second mounting manner different from the first mounting manner. The second mounting manner differs from the first mounting manner in that the first energy storage device 150 is detachably mounted to the housing 110 in the first mounting manner. Specifically, the battery pack 152 is pluggably mounted to the housing 110.

The battery pack 152 includes a battery pack housing 152a and the first energy storage unit 151 disposed on the battery pack housing 152a, where the first energy storage unit 151 may be specifically a cylindrical cell unit. The battery pack housing 152a is provided with a battery pack interface 152b through which the battery pack 152 is pluggably mounted to the housing 110, and the housing 110 is formed with a main body interface 110a corresponding to the battery pack interface 152b. The battery pack interface 152b mates with the main body interface 110a so that the battery pack 152 can be mechanically connected and electrically connected to the main body 100a. Further, a slide rail 152c is disposed at the battery pack interface 152b, where the slide rail 152c guides the battery pack 152 to be slidably mounted to the housing 110.

The second energy storage device 160 is connected to the housing 110 in the second mounting manner different from the first mounting manner, the first energy storage device 150 is detachably mounted to the housing, and the second energy storage device 160 may be connected to the housing in a fixed mounting manner different from the detachable mounting manner. Of course, it is to be noted that the second mounting manner does not limit that the second energy storage device 160 cannot be detachably mounted to the housing 110. Specifically, both the first energy storage device 150 and the second energy storage device 160 may be detachably mounted to the housing 110, but the first energy storage device 150 is pluggably mounted to the housing 110 and the second energy storage device 160 is mounted to the housing 110 in another detachable connection manner different from the pluggable connection manner. For example, the second energy storage device 160 is detachably mounted to the housing 110 in a snap connection manner. In this case, it may be considered that the pluggable connection manner of the first energy storage device 150 is different from the snap connection manner of the second energy storage device 160, that is to say, the first mounting manner of the first energy storage device 150 is different from the second mounting manner of the second energy storage device 160.

In this example, the second energy storage device 160 is fixedly mounted to the housing 110 in the second mounting manner. The second energy storage device 160 is configured to be fixedly mounted to the housing 110, where the fixed connection manner includes, but is not limited to, welding, screwing, snapping, or a non-movable connection. When the second energy storage device 160 is fixedly mounted to the housing 110, the second energy storage device 160 may not be detachable or may be detached from the housing 110 by the user by means of an external tool, thereby facilitating the maintenance of the second energy storage device 160.

The outdoor moving device 100 further includes a connection assembly through which the second energy storage device 160 is fixedly connected to housing 110, where the connection assembly may include a fastening element such as a screw. The second energy storage device 160 is specially adapted to the outdoor moving device 100. For some relatively large outdoor moving devices 100, the outdoor moving device 100 needs to work outdoors for a relatively long time, the outdoor moving device 100 consumes a relatively large amount of energy per unit time, and the second energy storage device 160 may store a relatively large amount of energy to supply power to the outdoor moving device 100. The second energy storage device 160 is fixedly mounted to the housing and has a shape better adapted to the outdoor moving device 100 so that the shape and structure of the second energy storage device 160 are more compact, a space occupation rate of the second energy storage unit 161 in the second energy storage device 160 may be set to be higher, and thus the second energy storage device 160 can have a relatively large amount of energy. The first energy storage device 150 includes the battery pack 152 detachably mounted to the housing 110, where the battery pack 152 may be configured to be adaptable to a power tool different from the outdoor moving device 100. For example, the power tool may be a blower 200a in FIG. 8. The outdoor moving device 100 further includes the first energy storage device 150 in addition to the second energy storage device 160, where the first energy storage device 150 may extend a working duration of the outdoor moving device 100 and can be adapted to other power tools so that in the case where the first energy storage device 150 of the outdoor moving device 100 temporarily has insufficient power, a power supply device of another power tool may supply power to the outdoor moving device 100. At the same time, the first energy storage device 150 is configured to be detachably mounted to the housing 110. In this manner, when the user needs to perform diverse tasks outdoors, in addition to the outdoor moving device 100, the user also needs to use other power tools to work. For example, the user uses the blower 200a to blow trimmed weeds or fallen leaves. At this time, the first energy storage device on the outdoor moving device 100 may supply power to the blower 200a, thereby improving the working flexibility of the outdoor moving device, facilitating a variety of outdoor tasks handled by the professional garden staff, extending an outdoor working duration, and improving working efficiency.

Figure 8:
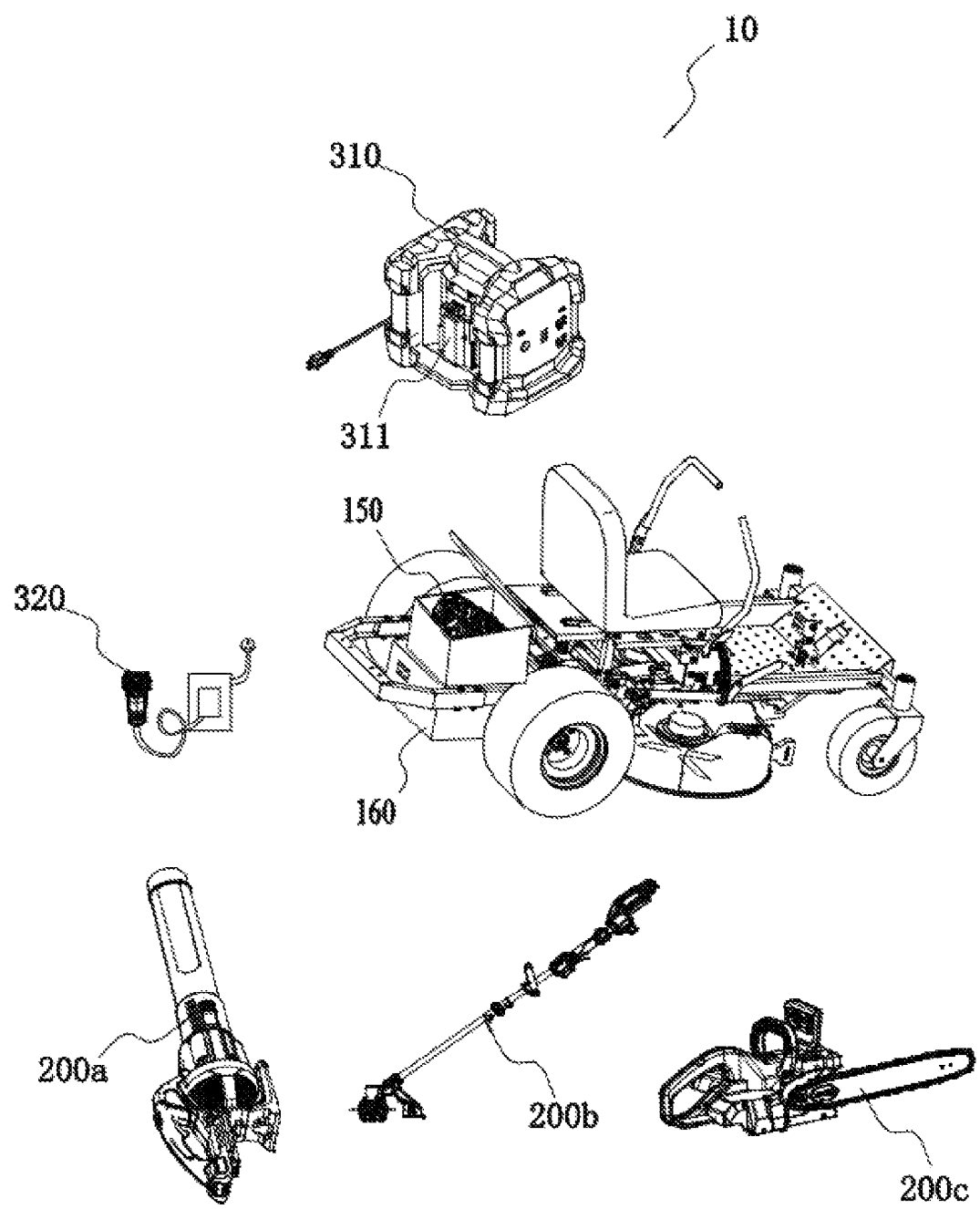
FIG. 8 is a perspective view of a tool system according to an example of the present application.

The battery pack 152 in the present application may be applied not only to the outdoor moving device 100 but also to other power tools, thereby improving the adaptability of the battery pack 152 and improving the ability of the outdoor moving device 100 to adapt to the battery pack 152 of another power tool. In this manner, when the outdoor moving device 100 is not in use, the user can detach the battery pack 152 for use with other power tools, thereby avoiding the waste of resources and reducing the cost of use. Alternatively, when the user needs to use the outdoor moving device 100, the user may use the battery pack 152 in another power tool as an energy source. The battery pack 152 includes multiple cell units connected in series, or multiple cell units connected in parallel, or multiple cell units connected in series and in parallel. Multiple cell units are integrated in the battery pack housing 152a so as to form a whole, where the cell units may specifically be lithium cell units. As shown in FIG. 8, the power tool may be the blower 200a, a garden tool such as a grass trimmer 200b and a chain saw 200c, a torque output tool such as an electric drill and an electric hammer, a sawing tool such as an electric circular saw, a jigsaw, and a reciprocating saw, or a grinding tool such as an angle grinder and a sander. Of course, in other examples, the battery pack may be configured to be capable of supplying power to a push power tool, such as a push mower and a push snow thrower. Of course, in other examples, the power tool may be another electric tool, such as a light. In this manner, in the present application, the battery pack 152 adapted to the outdoor moving device 100 can be unplugged by the user to be applied to the preceding power tools, that is to say, the user can use the battery packs 152 of these power tools as energy sources capable of supplying power to the outdoor moving device 100, thereby improving the versatility of the outdoor moving device 100 and reducing the cost of use.

In this example, total energy of the second energy storage device 160 is greater than total energy of the first energy storage device 150, and a total capacity of the second energy storage device 160 is also greater than a total capacity of the first energy storage device 150. The second energy storage device 160 is a power supply device specially adapted to the outdoor moving device, and the first energy storage device 150 is a power supply device adaptable to both the outdoor moving device and other power tools. In this manner, the adaptability of the outdoor moving device 100 is improved while the outdoor moving device 100 satisfies the requirement for working outdoors for a relatively long time.

The second energy storage device 160 is configured to be capable of supplying power to the moving electric motor 130, the first energy storage device 150 is also configured to be capable of supplying power to the moving electric motor 130, the second energy storage device 160 is further configured to be capable of supplying power to the drive electric motor 141, and the first energy storage device 150 is also configured to be capable of supplying power to the drive electric motor 141. In one power supply mode provided in other examples, the second energy storage device 160 can supply power to both the moving electric motor 130 and the drive electric motor 141, and the first energy storage device 150 supplies power to only the moving electric motor 130 and does not supply power to the drive electric motor 141. In one power supply mode provided in other examples, the second energy storage device 160 supplies power to both the moving electric motor 130 and the drive electric motor 141, and the first energy storage device 150 supplies power to only the drive electric motor 141. In one power supply mode provided in other examples, the second energy storage device 160 is configured to be capable of supplying power to the drive electric motor 141, and the first energy storage device 150 is configured to not supply power to the drive electric motor 141.

The total energy of the second energy storage device 160 is greater than the total energy of the first energy storage device 150. The structures and energy of the second energy storage device 160 and the first energy storage device 150 are configured such that the advantages of a large-energy power supply and a detachable power supply are achieved at the same time, and the problem of inflexibility of the large-energy power supply and the problem of small energy of the detachable power supply can be solved, thereby improving the power supply lifetime and flexibility of the outdoor moving device 100.

Figure 4:
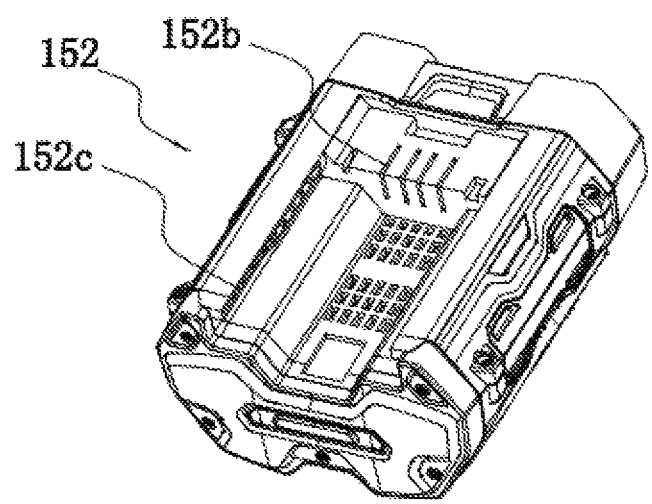
FIG. 4 is a perspective view of a first energy storage device in FIG. 2.
Figure 5:
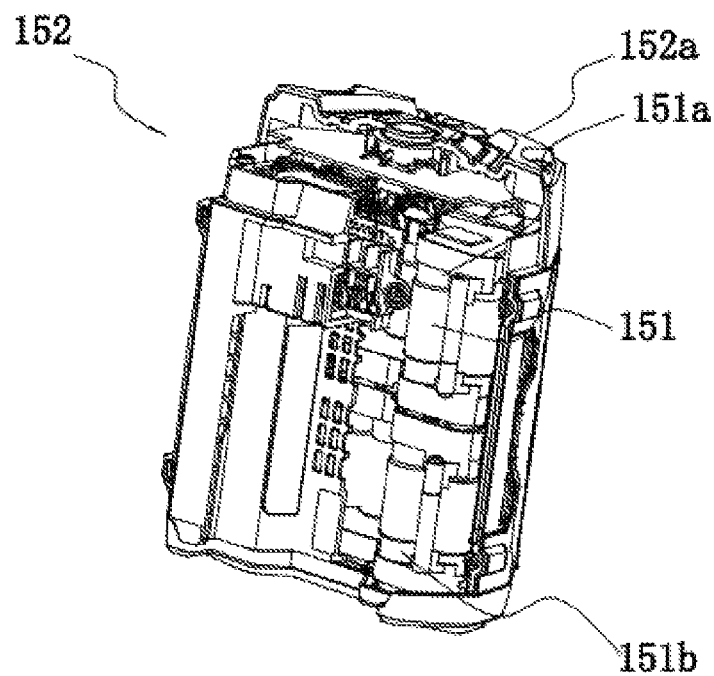
FIG. 5 is an interior view of the first energy storage device in FIG. 4.
Figure 6:
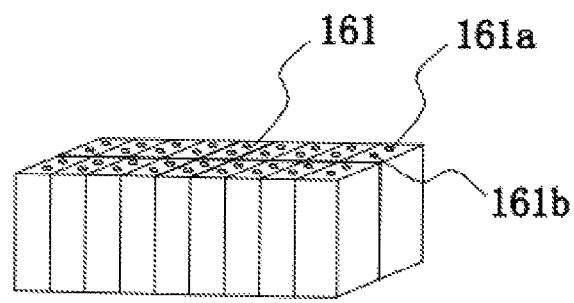
FIG. 6 is a perspective view of a second energy storage unit inside a second energy storage device in FIG. 2.

In this example, as shown in FIGS. 4 and 5, the first energy storage unit 151 in the battery pack housing 152*a* is a cylindrical cell unit and includes a first positive electrode 151*a* and a first negative electrode 151*b*, where the first positive electrode 151*a* and the first negative electrode 151*b* are disposed at two opposite ends of the cell unit. As shown in FIG. 6, the second energy storage unit 161 included in the second energy storage device 160 is a bulk cell unit, and multiple bulk cell units are stacked together, thereby reducing a volume of the second energy storage device 160. The bulk cell unit may specifically be cubic. The second energy storage unit 161 includes a second positive electrode 161*a* and a second negative electrode 161*b* that may be disposed on the same side surface of the cell unit.

Figure 7:
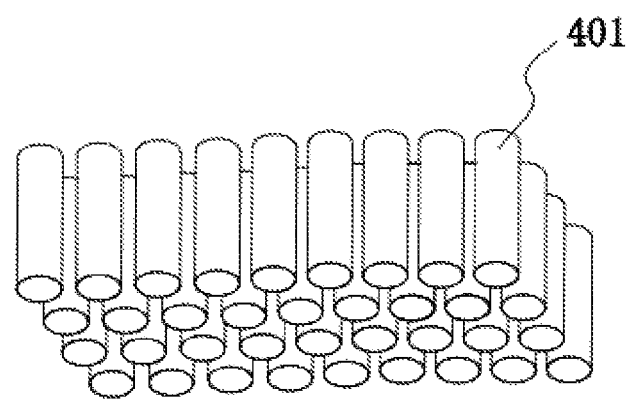
FIG. 7 is a perspective view of another second energy storage unit inside a second energy storage device in FIG. 2.

A second energy storage unit 401 in another example shown in FIG. 7 is also cylindrical.

In other examples, the second energy storage device 160 may include multiple energy storage packs disposed separately, where the multiple energy storage packs may be connected in parallel or in series.

An energy density of the first energy storage unit 151 is different from an energy density of the second energy storage unit 161. For the first energy storage device 150 and the second energy storage device 160 with different mounting manners, the first energy storage unit 151 and the second energy storage unit 161 with different energy densities are selected to separately adapt to the characteristics of the fixed connection manner and the detachable mounting and connection manner, thereby achieving the purposes of reducing the cost and improving the lifetime. In this example, the energy density of the first energy storage unit 151 is greater than the energy density of the second energy storage unit 161 so that the cost of the second energy storage device 160 with the larger total energy and the larger volume can be better considered. Optionally, a ratio of the energy density of the second energy storage unit 161 to the energy density of the first energy storage unit 151 is greater than or equal to 0.3 and less than or equal to 1. Alternatively, the ratio of the energy density of the second energy storage unit 161 to the energy density of the first energy storage unit 151 is greater than or equal to 0.8 and less than or equal to 1. Alternatively, the ratio of the energy density of the second energy storage unit 161 to the energy density of the first energy storage unit 151 is greater than or equal to 0.8 and less than or equal to 1.2. It is to be noted that the energy density in this example refers to a gravimetric energy density.

The first positive electrode 151*a* of the first energy storage unit 151 is made of a first material, and the second positive electrode 161*a* of the second energy storage unit 161 is made of a second material. The second material is different from the first material, and the first energy storage device 150 and the second energy storage device 160 of different types may supply power to the outdoor moving device 100 so that power supply platforms of other power tools on the market can be better considered, the cost of the outdoor moving device 100 can be reduced, and the total energy of the first energy storage device 150 can be increased. For example, in this example, the second positive electrode 161*a* of the second energy storage unit 161 is made of lithium iron phosphate, and the first positive electrode 151*a* of the first energy storage unit 151 is made of a material containing lithium. The first material and the second material may also be selected from nickel-cadmium batteries, graphene, and other materials, so as to achieve different combinations of battery characteristics.

In other examples, the second energy storage unit 161 may be a supercapacitor, which is also known as an electrochemical capacitor. Specifically, the second energy storage unit 161 is an asymmetric supercapacitor. An electrochemical capacitor based on the principle of bipolar plate capacitance is generally designed to be symmetric. Two identical materials with matched masses are used for a positive electrode and a negative electrode, such as an activated carbon electrode. The symmetric capacitor generally has no difference between the positive electrode and the negative electrode. Although a power density and a cycle life of the symmetric capacitor are excellent, an energy density of the symmetric capacitor is much lower than an energy density of a lithium-ion battery, a nickel metal hydride battery, or the like. However, two electrodes of the asymmetric capacitor use different materials, such as a carbon material/transition metal oxide system electrode material, a carbon material/conductive polymer system electrode material, or two activated carbon electrodes with different electrochemical properties, thereby improving the energy density of the electrochemical capacitor to 80 to 120 Wh/kg. In this manner, the electrochemical capacitor can be used as an energy supply unit of the power tool. For example, the second energy storage unit 161 may be a lithium-carbon capacitor (LCC).

Figure 11:
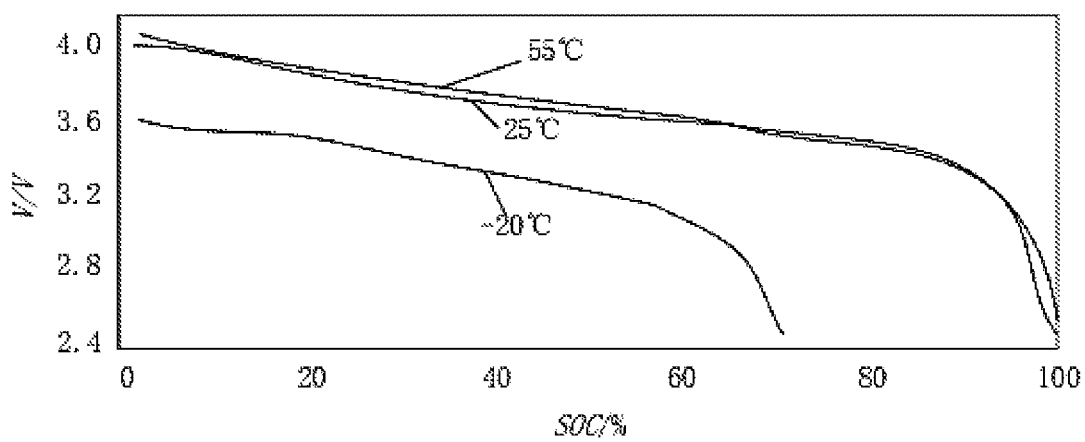
FIG. 11 is a graph illustrating discharge curves of a first energy storage device at different temperatures.
Figure 12:
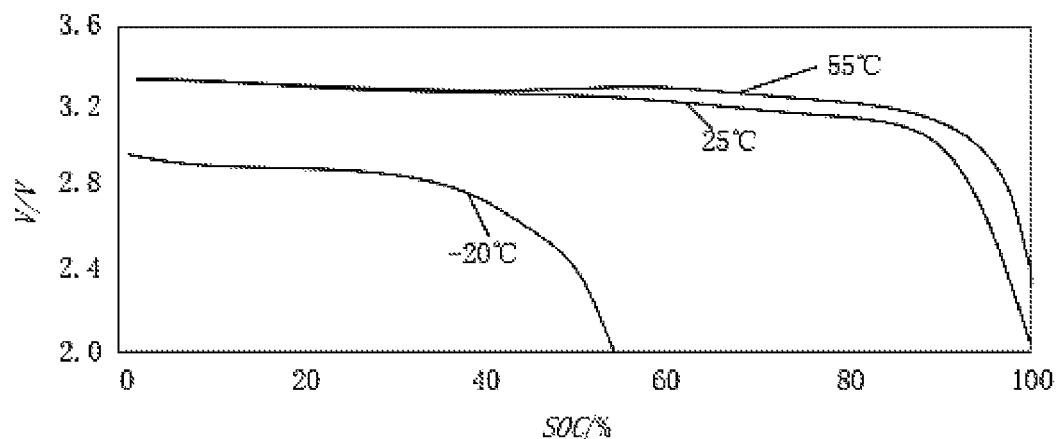
FIG. 12 is a graph illustrating discharge curves of a second energy storage device at different temperatures.

The first energy storage unit 151 and the second energy storage unit 161 use different materials so that the first energy storage device 150 and the second energy storage device 160 may have different service lives. In this manner, even when one of the first energy storage device 150 or the second energy storage device 160 is damaged, the other one can supply power to the outdoor moving device 100. Further, since the first energy storage unit 151 and the second energy storage unit 161 are made of different materials, a temperature characteristic of the first energy storage device 150 is different from a temperature characteristic of the second energy storage device 160. In this manner, when the outdoor moving device 100 works in a low-temperature environment, one of the first energy storage device 150 or the second energy storage device 160 which has a better low-temperature characteristic may be used for power supply. For example, in this example, the second energy storage unit 161 is a lithium iron phosphate cell, and the first energy storage unit 151 is a lithium cell. As shown in FIGS. 11 and 12, at −20° C., the second energy storage device 160 can release more power than the first energy storage device 150. Therefore, when the outdoor moving device 100 is in a low-temperature working environment, the outdoor moving device 100 may be powered by the second energy storage device 160 as much as possible so that the working efficiency of the outdoor moving device 100 can be improved.

The outdoor moving device 100 further includes an electrical connection assembly for electrically connecting the second energy storage device 160 to the moving electric motor 130 and a controller 175, where the connection assembly and the electrical connection assembly are separated from each other. For the first energy storage device 150, when the first energy storage device 150 is unplugged from the housing 110, the first energy storage device 150 can be mechanically disconnected from the housing 110 and can basically be electrically disconnected from the housing 110 at the same time. For the second energy storage device 160, the electrical connection assembly and the connection assembly are separated from each other. When the second energy storage device 160 is detached from the housing 110 through an auxiliary tool or multiple step operations, the second energy storage device 160 needs to be electrically and mechanically disconnected from the housing 110 in different operation manners separately.

Figure 13:
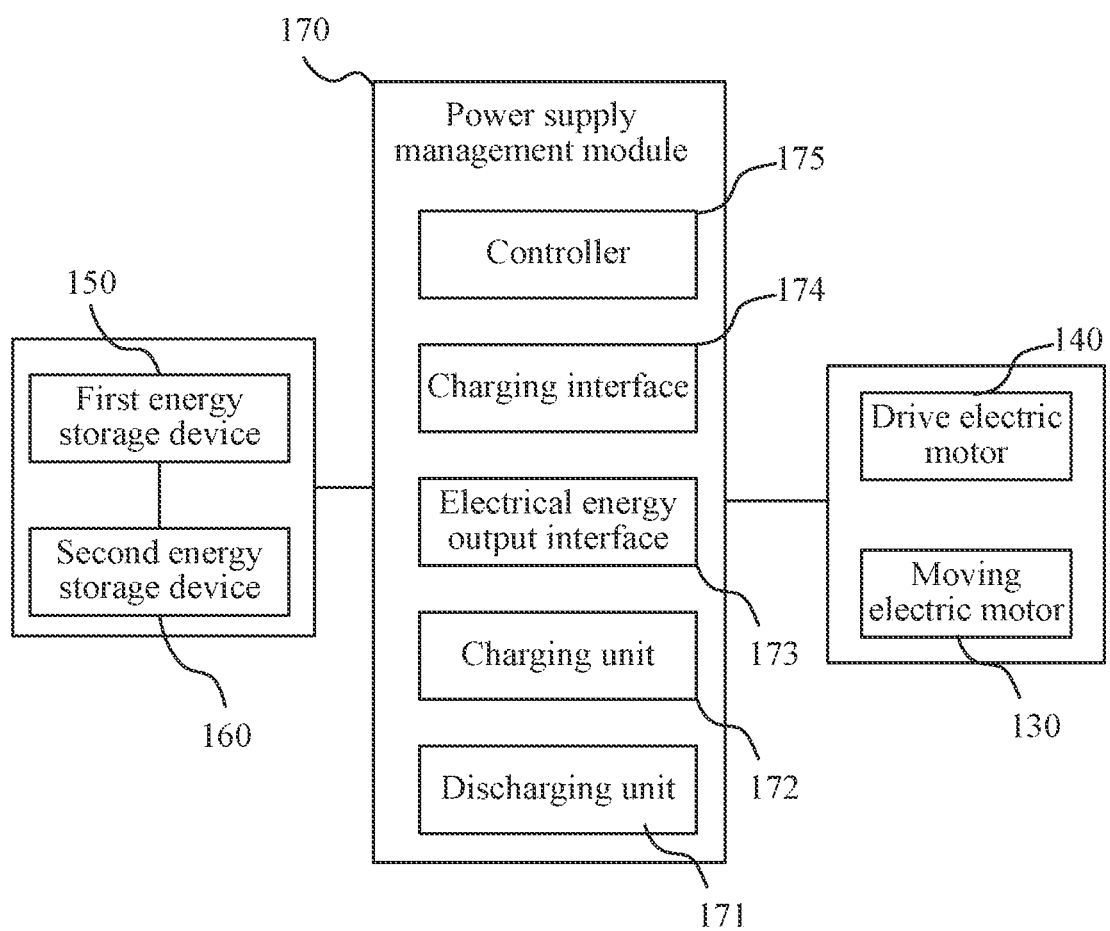
FIG. 13 is a logic block diagram of the outdoor moving device in FIG. 1.

As shown in FIGS. 1 and 13, the outdoor moving device 100 further includes a power supply management module 170, where the power supply management module 170 includes a discharging unit 171, a charging unit 172, an electrical energy output port 173, a charging interface 174, and the controller 175. The discharging unit 171 is electrically connected to the first energy storage device 150 and the moving electric motor 130 so that the first energy storage device 150 supplies power to the moving electric motor 130. Further, the discharging unit 171 is electrically connected to the second energy storage device 160 and the moving electric motor 130 so that the second energy storage device 160 supplies power to the moving electric motor 130.

The electrical connection assembly includes the discharging unit 171 electrically connected to the second energy storage device 160 and the first energy storage device 150, the controller 175 is electrically connected to the discharging unit 171, and the controller 175 is configured to control a discharge mode of the discharging unit 171.

The discharging unit 171 has a first discharge mode and a second discharge mode, and the controller 175 is electrically connected to the discharging unit 171 to control the discharging unit 171 to be in the first discharge mode or the second discharge mode. When the discharging unit 171 is in the first discharge mode, one of the first energy storage device 150 or the second energy storage device 160 supplies power to the outdoor moving device 100 and the other one of the first energy storage device 150 or the second energy storage device 160 does not supply power to the outdoor moving device 100. When the discharging unit 171 is in the second discharge mode, the first energy storage device 150 supplies power to the outdoor moving device 100 and the second energy storage device 160 also supplies power to the outdoor moving device 100. The controller 175 is configured to, when voltages of the second energy storage device 160 and the first energy storage device 150 are different, control the discharging unit 171 to be in the first discharge mode and when the voltages of the second energy storage device 160 and the first energy storage device 150 are the same, control the discharging unit 171 to be in the second discharge mode. In this manner, the first energy storage device 150 and the second energy storage device 160 can discharge together to provide sufficient electrical energy for the outdoor moving device 100. When the voltages of the first energy storage device 150 and the second energy storage device 160 are different, the discharging unit 171 is in the first discharge mode, and one of the first energy storage device 150 or the second energy storage device 160 which has a higher voltage discharges first.

The first energy storage device 150 and the second energy storage device 160 can discharge together only when the voltages of the first energy storage device 150 and the second energy storage device 160 are equal or basically equal, that is, the first energy storage device 150 and the second energy storage device 160 can discharge together only when a voltage difference between the first energy storage device 150 and the second energy storage device 160 is within a preset range. In this example, that the voltages of the first energy storage device 150 and the second energy storage device 160 are equal means that the voltage difference between the first energy storage device 150 and the second energy storage device 160 is less than a preset voltage difference threshold, where the preset voltage difference threshold may be 2 V or 1 V. The first energy storage device 150 and the second energy storage device 160 discharge together so that it can be ensured that a current in a discharging loop of the first energy storage device 150 and the second energy storage device 160 does not exceed a safe current value that the first energy storage device 150 and the second energy storage device 160 can withstand. This has the advantage that too large an output current of the outdoor moving device 100 can be avoided. The first energy storage device 150 and the second energy storage device 160 need to have equal or basically equal voltages to be capable of discharging together, that is, the discharging unit 171 is in the second discharge mode. That is, when the voltage difference between the first energy storage device 150 and the second energy storage device 160 is within the preset range, the following case can be avoided: due to a relatively large voltage difference between the first energy storage device 150 and the second energy storage device 160, the battery packs connected in parallel, when the first energy storage device 150 and the second energy storage device 160 discharge in parallel, the energy storage device with a high voltage charges the energy storage device with a low voltage, resulting in a reverse current flow, which is not conducive to the normal discharge of the first energy storage device 150 and the second energy storage device 160 and the normal operation of the outdoor moving device 100.

In other examples, when the discharging unit 171 is in the first discharge mode, the second energy storage device 160 supplies power to the outdoor moving device and the first energy storage device 150 does not supply power to the outdoor moving device. When the discharging unit 171 is in the second discharge mode, the first energy storage device 150 supplies power to the outdoor moving device and the second energy storage device 160 does not supply power to the outdoor moving device. The controller 175 is configured to, when remaining power of the second energy storage device 160 is greater than a preset value, control the discharging unit 171 to be in the first discharge mode and when the remaining power of the second energy storage device 160 is less than the preset value, control the discharging unit 171 to be in the second discharge mode. The second energy storage device 160 is preferably used for supplying power to the outdoor moving device, thereby ensuring that the first energy storage device 150 stores power in most cases and can be used for supplying power to the outdoor moving device or the power tool.

Specifically, maximum discharge power of the second energy storage device 160 is greater than or equal to 5 kW and less than or equal to 200 kW, and maximum discharge power of the first energy storage device 150 is greater than or equal to 1 kW and less than or equal to 10 kW. Alternatively, the maximum discharge power of the second energy storage device 160 is greater than or equal to 50 kW and less than or equal to 150 kW, and the maximum discharge power of the first energy storage device 150 is greater than or equal to 2 kW and less than or equal to 8 kW. In this manner, the first energy storage device 150 and the second energy storage device 160 have higher discharge efficiency. It is to be noted that the maximum discharge power is discharge power during the normal operation of the outdoor moving device 100, while abnormally large instantaneous discharge power occurring in the case where the outdoor moving device 100 has a locked-rotor or cuts some stones is not the maximum discharge power in this example.

The electrical energy output port 173 is used for outputting power to an external device and electrically connected to the second energy storage device 160 or the first energy storage device 150. The electrical energy output port 173 is directly electrically connected to the second energy storage device 160 so that the second energy storage device 160 can directly supply power to the external device. Alternatively, the outdoor moving device 100 directly supplies power to the external device by using the second energy storage device 160 and the first energy storage device 150 through the electrical energy output port 173, which is convenient for the user to use.

The charging unit 172 is electrically connected to the first energy storage device 150 and the second energy storage device 160 and also electrically connected to the controller 175 and the charging interface 174. The controller 175 controls the charging unit 172 to be electrically connected to an external power supply through the charging interface 174 so that the external power supply can supply power to the first energy storage device 150 and the second energy storage device 160 through the charging interface 174.

In this example, the charging unit 172 has a first charge mode and a second charge mode. The charging unit 172 in the first charge mode charges one of the first energy storage device 150 or the second energy storage device 160. The charging unit 172 in the second charge mode supplies power to the first energy storage device 150 and the second energy storage device 160 at the same time. The controller 175 is configured to, when the voltages of the first energy storage device 150 and the second energy storage device 160 are different, control the charging unit 172 to be in the first charge mode and when the voltages of the first energy storage device 150 and the second energy storage device 160 are basically the same, control the charging unit to be in the second charge mode. In this manner, when the voltages of the first energy storage device 150 and the second energy storage device 160 are different, the charging unit 172 is in the first charge mode and first charges one of the first energy storage device 150 or the second energy storage device 160 which has a lower voltage, and when the voltages of the first energy storage device 150 and the second energy storage device 160 are basically the same, the charging unit 172 switches to the second charge mode and can charge the first energy storage device 150 and the second energy storage device 160 at the same time. In this manner, not only can the first energy storage device 150 and the second energy storage device 160 more quickly satisfy the most basic requirement for power, but also the charge efficiency can be improved.

In other examples, the controller 175 may control the charging unit 172 to charge the first energy storage device 150 to a preset fully charged state and then charge the second energy storage device 160. Alternatively, the controller 175 may control the charging unit 172 to charge the second energy storage device 160 to the preset fully charged state and then charge the first energy storage device 150. Alternatively, the charging unit 172 is configured to charge the second energy storage device 160 to a first preset state, then charge the first energy storage device 150 to a second preset state, and then continue charging the second energy storage device 150. The second preset state may be a full capacity or another preset power value. After charged to the first preset state, the second energy storage device 160 has an ability to supply power to the outdoor moving device 100 for a certain time, so as to switch to the power supply to the first energy storage device 150 and ensure that the first energy storage device 150 can supply power to the power tool. In this manner, when the outdoor moving device 100 is charged for a short time or is not fully charged, the operation of the outdoor moving device 100 can still be achieved, and the first energy storage device 150 can supply power to the power tool, which is convenient for the user to use.

Optionally, to adapt to performance parameters of the second energy storage device 160 and the first energy storage device 150, a maximum charge current at which the charging unit 172 charges the second energy storage device 160 is greater than or equal to 0.04 C and less than or equal to 4 C, and a maximum charge current at which the charging unit 172 charges the first energy storage device 150 is greater than or equal to 0.04 C and less than or equal to 4 C. Therefore, the charging time of the first energy storage device 150 and the second energy storage device 160 can be controlled more effectively. The maximum charge current of the first energy storage device 150 is N C, which means that the first energy storage device 150 can be fully charged within 1/N hour. Similarly, the maximum charge current of the second energy storage device 160 is M C, which means that the second energy storage device 160 can be fully charged within 1/M hour. Alternatively, the maximum charge current at which the charging unit 172 charges the second energy storage device 160 is greater than or equal to 0.1 C and less than or equal to 4 C, and the maximum charge current at which the charging unit 172 charges the first energy storage device 150 is greater than or equal to 0.1 C and less than or equal to 4 C. Alternatively, the maximum charge current at which the charging unit 172 charges the second energy storage device 160 is greater than or equal to 0.5 C and less than or equal to 4 C, and the maximum charge current at which the charging unit 172 charges the first energy storage device 150 is greater than or equal to 0.5 C and less than or equal to 4 C. In this manner, the first energy storage device 150 and the second energy storage device 160 can be fully charged in a relatively short period of time.

A ratio of the maximum charge current at which the charging unit 172 charges the second energy storage device 160 to the maximum charge current at which the charging unit 172 charges the first energy storage device 150 is greater than or equal to 0.02 and less than or equal to 10, thereby adapting to energy characteristic settings of the second energy storage device 160 and the first energy storage device 150 and achieving the charging time adjustment of the second energy storage device 160 and the first energy storage device 150. Alternatively, the ratio of the maximum charge current at which the charging unit 172 charges the second energy storage device 160 to the maximum charge current at which the charging unit 172 charges the first energy storage device 150 is greater than or equal to 0.05 and less than or equal to 1. It is to be noted that the ratio of the maximum charge current at which the charging unit 172 charges the second energy storage device 160 to the maximum charge current at which the charging unit 172 charges the first energy storage device 150 refers to a ratio of the maximum charge current M C of the second energy storage device 160 to the maximum charge current N C of the first energy storage device 150, that is, a ratio of M to N.

Referring to FIGS. 1 and 3, the outdoor moving device 100 further includes a charging and discharging control circuit 176. The charging and discharging control circuit 176 includes the discharging unit 171 and the charging unit 172. Specifically, the charging and discharging control circuit 176 includes multiple drive switches that form a bridge circuit. The first energy storage device 150 may be provided with multiple battery packs. The first energy storage device 150 provided with two battery packs is used as an example. In this example, one battery pack may be considered as a second energy storage device 160 and another battery pack may be considered as a third energy storage device 180. The first energy storage device 150, the second energy storage device 160, and the third energy storage device 180 are connected in parallel. In this example, the charging and discharging control circuit 176 includes drive switches Q1, Q2, Q3, Q4, Q5, and Q6. The drive switches Q1 to Q6 may be semiconductor devices, such as metal-oxide-semiconductor field-effect transistors (MOSFETs) or insulated-gate bipolar transistors (IGBTs). Each drive switch is connected in parallel with a parasitic diode. The drive switch Q4 is a discharge switch of the first energy storage device 150, the drive switch Q1 is a charge switch of the first energy storage device 150, the drive switch Q5 is a discharge switch of the third energy storage device 180, the drive switch Q2 is a charge switch of the third energy storage device 180, the drive switch Q3 is a discharge switch of the second energy storage device 160, and the drive switch Q6 is a charge switch of the second energy storage device 160.

In a charging process, the charging and discharging control circuit 176 controls a charging sequence of the first energy storage device 150, the second energy storage device 160, and the third energy storage device 180. That is, in the charging process, the controller 175 controls the drive switches Q4, Q5, and Q6 to be turned on, the charging unit 172 charges the energy storage device with the lowest voltage, and the diode prevents the energy storage devices with higher voltages from being charged. The energy storage devices are charged until the voltages of multiple energy storage devices are consistent, and the charging unit 172 supplies power to the multiple energy storage devices at the same time, so as to ensure voltage consistency. For example, when the first energy storage device 150 has the lowest voltage and the second energy storage device 160 has the highest voltage, the controller 175 controls Q4, Q5, and Q6 to be turned on. At this time, the diode connected in parallel with the drive switch Q1 for the first energy storage device 150 is turned on, and the diodes connected in parallel with the drive switches Q2 and Q3 are turned off so that the external power supply connected to the charging interface 174 can supply power to only the first energy storage device 150, and the charging unit 172 is in the first charge mode. When the voltage of the first energy storage device 150 increases to be the same as the voltage of the third energy storage device 180, the diode connected in parallel with the drive switch Q2 is turned on. At this time, the external power supply connected to the charging interface 174 supplies power to the first energy storage device 150 and the third energy storage device 180. When the voltage of the first energy storage device 150 and the voltage of the third energy storage device 180 increase to be the same as the voltage of the second energy storage device 160, the diode connected in parallel with the drive switch Q3 is turned on. At this time, the external power supply connected to the charging interface 174 supplies power to the first energy storage device 150, the second energy storage device 160, and the third energy storage device 180 at the same time, and the charging unit 172 is in the second charge mode.

In a discharging process, the charging and discharging control circuit 176 controls a discharging sequence of the first energy storage device 150, the second energy storage device 160, and the third energy storage device 180. That is, in the discharging process, the controller 175 controls the drive switches Q1, Q2, and Q3 to be turned on, the discharging unit 171 discharges the energy storage device with the highest voltage firstly, and the diode prevents the energy storage devices with lower voltages from being discharged. The energy storage devices are discharged until the voltages of the multiple energy storage devices are consistent, and the discharging unit 171 discharges the multiple energy storage devices at the same time, so as to ensure the voltage consistency. For example, when the first energy storage device 150 has the lowest voltage and the second energy storage device 160 has the highest voltage, the controller 175 controls Q1, Q2, and Q3 to be turned on. At this time, the diode connected in parallel with the drive switch Q6 for the second energy storage device 160 is turned on, and the diodes connected in parallel with the drive switches Q4 and Q5 are turned off so that the second energy storage device 160 can supply power to the moving electric motor 130, and the discharging unit 171 is in the first discharge mode. When the voltage of the second energy storage device 160 decreases to be the same as the voltage of the third energy storage device 180, the diode connected in parallel with the drive switch Q5 is turned on, and at this time, the second energy storage device 160 and the third energy storage device 180 supply power to the moving electric motor at the same time. When the voltage of the second energy storage device 160 and the voltage of the third energy storage device 180 decrease to be the same as the voltage of the first energy storage device 150, the diode connected in parallel with the drive switch Q4 is turned on, the first energy storage device 150, the second energy storage device 160, and the third energy storage device 180 supply power to the moving electric motor 130 at the same time, and the discharging unit 171 is in the second discharge mode.

The second energy storage device 160 is configured to be capable of charging the first energy storage device 150, that is to say, when both the second energy storage device 160 and the first energy storage device 150 are mounted to the main body 100a, the second energy storage device 160 can charge the first energy storage device 150.

In this example, the total energy of the second energy storage device 160 is greater than the total energy of the first energy storage device 150. When remaining power of the first energy storage device 150 is insufficient, the second energy storage device 160 may charge the first energy storage device so that the platformed first energy storage device 150 can satisfy more working requirements of the user. In this example, a ratio of the total energy of the second energy storage device 160 to the total energy of the first energy storage device 150 is greater than or equal to 1 and less than or equal to 50. Alternatively, the ratio of the total energy of the second energy storage device 160 to the total energy of the first energy storage device 150 is greater than or equal to 2 and less than or equal to 20. Alternatively, the ratio of the total energy of the second energy storage device 160 to the total energy of the first energy storage device 150 is greater than or equal to 5 and less than or equal to 20. It is to be noted that, in this example, the total energy of the first energy storage device 150 may be understood as total energy of one battery pack 152 included in the first energy storage device 150 or may be understood as total energy of all the battery packs 152 included in the first energy storage device 150.

In this example, the total capacity of the second energy storage device 160 is greater than the total capacity of the first energy storage device 150. When the remaining power of the first energy storage device 150 is insufficient, the second energy storage device 160 may charge the first energy storage device so that the platformed first energy storage device 150 can satisfy more working requirements of the user. In this example, a ratio of the total capacity of the second energy storage device 160 to the total capacity of the first energy storage device 150 is greater than or equal to 1 and less than or equal to 50. Alternatively, the ratio of the total capacity of the second energy storage device 160 to the total capacity of the first energy storage device 150 is greater than or equal to 2 and less than or equal to 20. Alternatively, the ratio of the total capacity of the second energy storage device 160 to the total capacity of the first energy storage device 150 is greater than or equal to 5 and less than or equal to 20. It is to be noted that, in this example, the total capacity of the first energy storage device 150 may be understood as a total capacity of one battery pack 152 included in the first energy storage device 150 or may be understood as a total capacity of all the battery packs 152 included in the first energy storage device 150.

Optionally, the second energy storage device 160 is configured to charge the first energy storage device 150 when the remaining power of the first energy storage device 150 is less than a preset value. Therefore, when using the outdoor moving device 100 to work outdoors, the user may carry other power tools such as the blower 200a and a pruner and use the first energy storage device 150 to supply power to the power tool such as the blower 200a or the pruner; when the power of the first energy storage device 150 is used up, the user may charge the first energy storage device 150 again by using the second energy storage device 160. The second energy storage device 160 and the first energy storage device 150 form a power supply station as a whole so that the power supply time of the outdoor moving device 100 can be ensured, and the energy storage devices can be flexibly used.

Specifically, the charging unit 172 may be connected to the first energy storage device 150 and the second energy storage device 160 separately and transfer the power stored in the second energy storage device 160 to the first energy storage device 150.

Figure 3B:
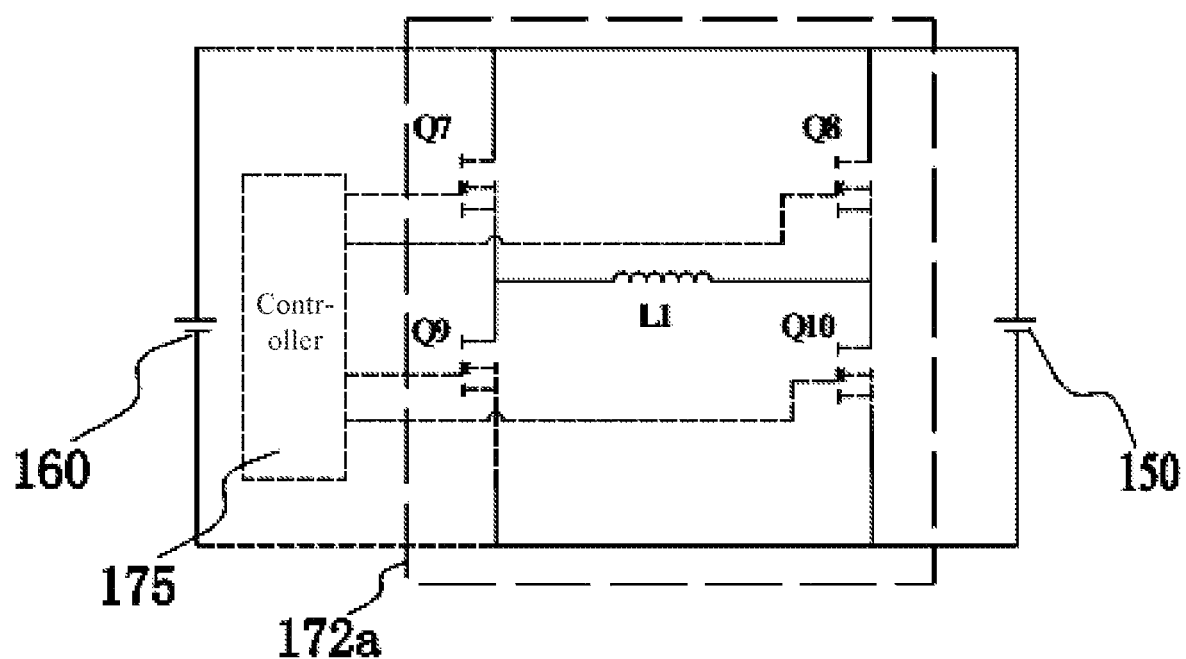
FIG. 3B is a circuit diagram in which a second energy storage device charges a first energy storage device.

As shown in FIGS. 13 and 3B, the charging unit 172 further includes a charging circuit 172a disposed between the first energy storage device 150 and the second energy storage device 160. The charging circuit 172a is electrically connected to the controller 175 so that the second energy storage device 160 can supply power to the first energy storage device 150. When the voltage of the second energy storage device 160 is higher than the voltage of the first energy storage device 150, the controller 175 can control the charging circuit 172a to adjust a charge current at which the second energy storage device 160 charges the first energy storage device 150 and reduce a charge voltage outputted by the second energy storage device 160 to the first energy storage device 150, thereby avoiding too high a temperature of the charging unit 172 caused by too large a charge current and the resulting danger, and improving the safety of the second energy storage device 160 charging the first energy storage device 150. When the voltage of the second energy storage device 160 is lower than the voltage of the first energy storage device 150, the controller 175 can control the charging circuit 172a to increase the charge voltage outputted by the second energy storage device 160 to the first energy storage device 150, thereby avoiding the case where the current is reversed and the first energy storage device 150 cannot be charged. Specifically, the charging circuit 172a includes a full bridge circuit composed of drive switches Q7, Q8, Q9, and Q10 and an inductor L1 connected between two bridge arms. The drive switches Q7, Q8, Q9, and Q10 may be semiconductor devices, such as MOSFETs or IGBTs. The second energy storage device 160 is connected to an input terminal of the charging circuit 172a, and the first energy storage device 150 is connected to an output terminal of the charging circuit 172a. The second energy storage device 160 supplies power to the first energy storage device 150 through the charging circuit 172a. The controller 175 is connected to control terminals of the drive switches Q7, Q8, Q9, and Q10 to control duty cycles of the drive switches Q7, Q8, Q9, and Q10, and an output voltage outputted by the second energy storage device 160 to the first energy storage device 150 is achieved by controlling the duty cycles of the drive switches Q7, Q8, Q9, and Q10. When the second energy storage device 160 charges the first energy storage device 150, the controller 175 controls the drive switch Q7 and the drive switch Q10 to be turned on and controls the drive switch Q8 and the drive switch Q9 to be turned off. In this manner, the charge current flows through the drive switch Q7, the inductor L1, and the drive switch Q10 in sequence so that power is stored in the inductor L1. Then, the controller 175 controls the drive switch Q8 and the drive switch Q9 to be turned off and controls the drive switch Q7 and the drive switch Q10 to be turned off. In this manner, the charge current flows through Q9 and the drive switch Q8 in sequence, thereby charging the first energy storage device 150. The charging circuit 172a is provided so that the second energy storage device 160 charges the first energy storage device 150 more safely and efficiently. In this manner, the flexibility and safety of the outdoor moving device 100 are improved.

A ratio of a maximum lifetime of the second energy storage device 160 when the outdoor moving device 100 is in a load-free operation state to a maximum lifetime of the first energy storage device 150 when the outdoor moving device is in the load-free operation state is greater than or equal to 1 and less than or equal to 50. Alternatively, the ratio of the maximum lifetime of the second energy storage device 160 when the outdoor moving device 100 is in the load-free operation state to the maximum lifetime of the first energy storage device 150 when the outdoor moving device 100 is in the load-free operation state is greater than or equal to 2 and less than or equal to 20. Alternatively, the ratio of the maximum lifetime of the second energy storage device 160 when the outdoor moving device 100 is in the load-free operation state to the maximum lifetime of the first energy storage device 150 when the outdoor moving device 100 is in the load-free operation state is greater than or equal to 3 and less than or equal to 10. In this manner, the relatively long lifetime of the outdoor moving device 100 can be satisfied while the dimensions of the outdoor moving device 100 are relatively small.

The outdoor moving device 100 further includes a first identification terminal and a second identification terminal, where the first identification terminal matches with the second energy storage device 160, and the second identification terminal matches with the first energy storage device 150. A type of the second energy storage device 160 and a type of the first energy storage device 150 are identified through the first identification terminal and the second identification terminal and the first energy storage device 150 and the second energy storage device 160 are allowed to be connected to a driver circuit and the charging circuit. Optionally, the first identification terminal and the second identification terminal are different. Optionally, the first identification terminal and the second identification terminal are the same.

The outdoor moving device 100 may include multiple mounting positions where first energy storage devices 150 are mounted so that multiple first energy storage devices 150 can be mounted to the outdoor moving device 100 and the user may mount one or more first energy storage devices 150 according to requirements. In this example, the outdoor moving device 100 is the riding mower, and the seat 111 of the riding mower is disposed substantially at the middle position of the main body 100a. The first energy storage device 150 and the second energy storage device 160 may be disposed on a rear side of the seat 111. The first energy storage device 150 is disposed on an upper side of the second energy storage device 160, that is, the second energy storage device 160 is fixedly connected to the outdoor moving device 100 and the first energy storage device 150 is pluggably mounted above the second energy storage device 160. The second energy storage device 160 and the first energy storage device 150 are stacked in an up and down direction so that the dimensions of the outdoor moving device 100 can be reduced, the structure of the outdoor moving device 100 is more compact, and thus the entire outdoor moving device 100 is more maneuverable. Moreover, the first energy storage device 150 is pluggably mounted above the second energy storage device 160, which is convenient for the user to detach and mount the first energy storage device 150. A direction along which the first energy storage device 150 is plugged and unplugged is inclined relative to the up and down direction, thereby facilitating the installation of the first energy storage device 150 by the user. A distance between the second energy storage device 160 and an axle of the rear moving wheels 131 in the front and rear direction is greater than or equal to 0 cm and less than or equal to 100 cm so that a center of gravity of the riding mower is disposed more reasonably. Alternatively, in other examples, the distance between the second energy storage device 160 and the axle of the rear moving wheels 131 in the front and rear direction is greater than or equal to 0 cm and less than or equal to 50 cm. Alternatively, in other examples, the distance between the second energy storage device 160 and the axle of the rear moving wheels 131 in the front and rear direction is greater than or equal to 0 cm and less than or equal to 20 cm. A distance of 0 cm between the second energy storage device 160 and the axle of the rear moving wheels 131 means that a projection of the second energy storage device 160 overlaps with a projection of the rear moving wheels 131. The distance in this example refers to a dimension of a gap between two devices in a certain direction.

In other examples, the first energy storage device 150 may be disposed on a front side of the second energy storage device 160.

In other examples, the first energy storage device 150 may be disposed on a rear side of the second energy storage device 160.

The second energy storage device 160 is disposed near the rear moving wheels 131 such that the projection of the second energy storage device 160 in the up and down direction at least partially overlaps with the projection of the rear moving wheels 131 in the up and down direction. The distance between the second energy storage device 160 and the axle of the rear moving wheels 131 in the front and rear direction is greater than or equal to 0 cm and less than or equal to 100 cm. A projection of the first energy storage device 150 in the up and down direction at least partially overlaps with the projection of the rear moving wheels 131 in the up and down direction, which is convenient for the user to mount the battery pack from the rear of the outdoor moving device. In a left and right direction, the second energy storage device 160 and the first energy storage device 150 are disposed basically on a central axis of the outdoor moving device 100.

A distance between a center of gravity of the second energy storage device 160 and the axle of the rear moving wheels 131 in the up and down direction is greater than or equal to 0 cm and less than or equal to 50 cm so that the center of gravity of the outdoor moving device 100 can be effectively lowered.

Figure 10:
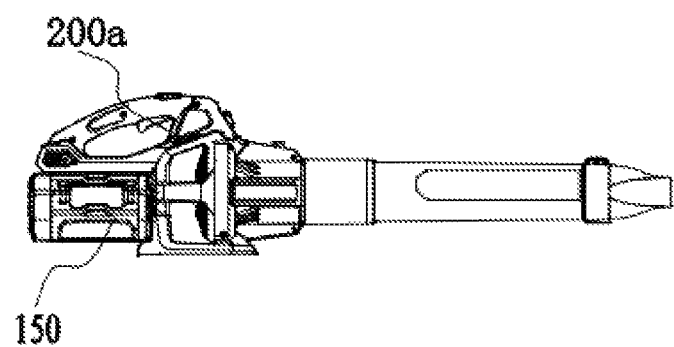
FIG. 10 is a plan view of a blower and a first energy storage device in FIG. 8.

A tool system 10 shown in FIG. 8 includes an adapter 310, the outdoor moving device 100, and a power tool, where the power tool may be the blower 200a, a grass trimmer 200b, or a chain saw 200c. The second energy storage device 160 in the outdoor moving device 100 is used for supplying power to the outdoor moving device. The first energy storage device 150 is detachable from the housing 110 to supply power to the power tool, in addition to supplying power to the outdoor moving device 100. As shown in FIG. 10, the battery pack 152 in the first energy storage device 150 may be detached to supply power to the blower 200a. The blower 200a is provided with a tool interface 201 mating with the battery pack interface 152b. The tool interface 201 may have the same structure as the main body interface in the outdoor moving device 100. In this manner, the adaptability of the battery pack 152 is further improved.

Figure 9:
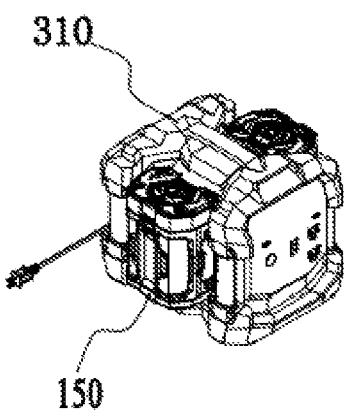
FIG. 9 is a perspective view of an adapter and a first energy storage device in FIG. 8.

In this example, the tool system 10 further includes a charging device 320 for charging the outdoor moving device. The charging device 320 may be considered as a part of the outdoor moving device 100. The charging device 320 can mate with the charging interface 174 in FIG. 3, and the charging device 320 can be electrically connected to the external power supply so that the charging device 320 can electrically connect the external power supply to the charging interface 174, thereby supplying power to the first energy storage device 150 and the second energy storage device 160. In addition to being detachable to charge other power tools, the first energy storage device 150 may be charged by charging devices or charging platforms of other power tools. In other words, in addition to being charged in the outdoor moving device 100, the first energy storage device 150 may be detached to be separately charged by other charging devices so that the second energy storage device 160 and the first energy storage device 150 can be charged by different charging platforms at the same time, so as to achieve the purpose of fast charging. For example, in this example, the tool system 10 further includes the adapter 310, where power may be supplied to the first energy storage device 150 through the adapter when the first energy storage device 150 is detached from the outdoor moving device 100. In this manner, for the user working outdoors, power may be supplied to the first energy storage device 150 through the adapter 310 when no charging device 320 exists nearby. In this manner, when both the remaining power of the first energy storage device 150 and the remaining power of the second energy storage device 160 of the outdoor moving device 100 are insufficient, the first energy storage device 150 may be charged through the adapter 310 in time so that the lifetime of the outdoor moving device 100 can be improved. The adapter 310 is also configured to be a platformed and widely applicable charger. In this manner, the tool system 10 can better adapt to work requirements of both a home DIY (do it yourself) user and a commercial professional user so that the utility of the tool system can be improved. In this manner, the flexibility of the first energy storage device 150 in the outdoor moving device 100 is further improved. In this example, the adapter 310 is provided with an adapter interface 311 capable of mating with the first energy storage device 150. As shown in FIG. 9, the first energy storage device 150 is detachably mounted to the adapter 310, where the adapter 310 can continuously charge the first energy storage device 150.

In this example, a nominal voltage of the battery pack 152 included in the first energy storage device 150 is 56 V. Of course, it is to be understood that a nominal voltage of the first energy storage device 150 may be greater than or equal to 20 V and less than or equal to 100 V, or the nominal voltage of the first energy storage device 150 may be greater than or equal to 36 V and less than or equal to 80 V, or the nominal voltage of the first energy storage device 150 may be greater than or equal to 40 V and less than or equal to 60 V. Alternatively, the nominal voltage of the first energy storage device 150 may be greater than or equal to 100 V and less than or equal to 800 V. It is to be understood that the nominal voltage of the first energy storage device 150 may be 20 V, 24 V, 36 V, 40 V, 48 V, 56 V, 60 V, 80 V, 100 V, 400 V, or 800 V. In this manner, the voltage of the first energy storage device 150 can be adapted to a voltage platform of the second energy storage device 160 so that the total energy of the second energy storage device 160 can be increased.

A nominal voltage of the second energy storage device 160 is the same as the nominal voltage of the first energy storage device 150. Of course, it is to be understood that the nominal voltage of the second energy storage device 160 may be different from the nominal voltage of the first energy storage device 150. The nominal voltage of the second energy storage device 160 may be greater than or equal to 20 V and less than or equal to 100 V, or the nominal voltage of the second energy storage device 160 may be greater than or equal to 36 V and less than or equal to 80 V, or the nominal voltage of the second energy storage device 160 may be greater than or equal to 40 V and less than or equal to 60 V. Alternatively, the nominal voltage of the second energy storage device 150 may be greater than or equal to 100 V and less than or equal to 800 V. It is to be understood that the nominal voltage of the second energy storage device 160 may be 20 V, 24 V, 36 V, 40 V, 48 V, 56 V, 60 V, 80 V, 100 V, 400V, or 800 V. In this manner, the voltage of the second energy storage device 160 can be adapted to a voltage platform of the first energy storage device 150, which can be adapted to more power tools.

In this example, the total capacity of the first energy storage device 150 is greater than or equal to 4 Ah and less than or equal to 80 Ah. Alternatively, the total capacity of the first energy storage device 150 is greater than or equal to 10 Ah and less than or equal to 40 Ah. Alternatively, the total capacity of the first energy storage device 150 is greater than or equal to 20 Ah and less than or equal to 60 Ah. In this manner, the first energy storage device 150 can satisfy both the lifetime requirements of other power tools and the requirement of other power tools for relatively small dimensions. The total capacity of the second energy storage device 160 is greater than or equal to 10 Ah and less than or equal to 500 Ah. Alternatively, the total capacity of the second energy storage device 160 is greater than or equal to 20 Ah and less than or equal to 500 Ah. Alternatively, the total capacity of the second energy storage device 160 is greater than or equal to 40 Ah and less than or equal to 400 Ah. Alternatively, the total capacity of the second energy storage device 160 is greater than or equal to 60 Ah and less than or equal to 600 Ah. In this manner, the second energy storage device 160 can satisfy the requirement of the outdoor moving device 100 for working for more than half a day and can be adapted to the dimensions of the outdoor moving device 100.

Alternatively, the total capacity of the first energy storage device 150 is greater than or equal to 4 Ah and less than or equal to 10 Ah. Alternatively, the total capacity of the first energy storage device 150 is greater than or equal to 10 Ah and less than or equal to 20 Ah. Alternatively, the total capacity of the first energy storage device 150 is greater than or equal to 20 Ah and less than or equal to 30 Ah. Alternatively, the total capacity of the first energy storage device 150 is greater than or equal to 30 Ah and less than or equal to 40 Ah. Alternatively, the total capacity of the first energy storage device 150 is greater than or equal to 50 Ah and less than or equal to 60 Ah. Alternatively, the total capacity of the first energy storage device 150 is greater than or equal to 60 Ah and less than or equal to 80 Ah. The total capacity of the second energy storage device 160 is greater than or equal to 10 Ah and less than or equal to 20 Ah. Alternatively, the total capacity of the second energy storage device 160 is greater than or equal to 20 Ah and less than or equal to 40 Ah. Alternatively, the total capacity of the second energy storage device 160 is greater than or equal to 40 Ah and less than or equal to 60 Ah. Alternatively, the total capacity of the second energy storage device 160 is greater than or equal to 60 Ah and less than or equal to 80 Ah. Alternatively, the total capacity of the second energy storage device 160 is greater than or equal to 80 Ah and less than or equal to 100 Ah.

Alternatively, the total capacity of the second energy storage device 160 is greater than or equal to 100 Ah and less than or equal to 200 Ah. Alternatively, the total capacity of the second energy storage device 160 is greater than or equal to 200 Ah and less than or equal to 400 Ah. Alternatively, the total capacity of the second energy storage device 160 is greater than or equal to 400 Ah and less than or equal to 600 Ah.

The total energy of the first energy storage device 150 is greater than or equal to 100 Wh and less than or equal to 4000 Wh. The total energy of the first energy storage device 150 is greater than or equal to 100 Wh and less than or equal to 1500 Wh. The total energy of the second energy storage device 160 is greater than or equal to 1 kWh and less than or equal to 30 kWh. Alternatively, in other examples, the total energy of the first energy storage device 150 is greater than or equal to 300 Wh and less than or equal to 1000 Wh. The total energy of the second energy storage device 160 is greater than or equal to 2 kWh and less than or equal to 20 kWh. Alternatively, in other examples, the total energy of the first energy storage device 150 is greater than or equal to 300 Wh and less than or equal to 8000 Wh. The total energy of the second energy storage device 160 is greater than or equal to 5 kWh and less than or equal to 20 kWh. In this manner, the total capacity of the first energy storage device 150 and the total capacity of the second energy storage device 160 are more reasonable, that is, the outdoor moving device 100 can work outdoors for more than one hour while the dimensions of the outdoor moving device 100 can be reduced as much as possible. Moreover, the total capacity of the first energy storage device 150 and the total capacity of the second energy storage device 160 can satisfy both the requirement of the professional user for working outdoors all day long and the requirement of the DIY user for working for a relatively long time and the relatively small dimensions of the device.

As a specific example, the total energy of the first energy storage device 150 is 4000 Wh. The total energy of the second energy storage device 160 is 20 kWh. In this manner, when both the first energy storage device 150 and the second energy storage device 160 of the outdoor moving device 100 are in the fully charged states, the outdoor moving device 100 can mow the grass through the second energy storage device for four to six hours, and another power tool to which the first energy storage device 150 can be mounted can work for four to five hours. For example, the blower 200a blows fallen leaves or weeds for one hour, the grass trimmer 200b trims grass for one hour, the pruner prunes shrubs for one hour, and the chain saw 200c cuts branches for one hour. In this manner, a professional garden maintenance person can work all day long by using the first energy storage device 150 and the second energy storage device 160 provided on the outdoor moving device 100 and can perform various tasks required for garden maintenance.

In this example, a distance between the second energy storage device 160 and the first energy storage device 150 in the left and right direction is greater than or equal to 0 cm and less than or equal to 50 cm.

Figure 14:
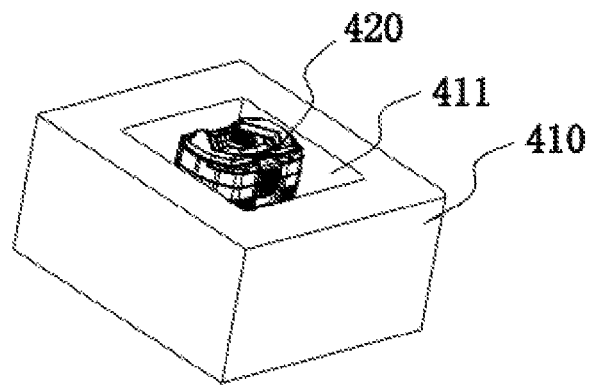
FIG. 14 is a perspective view of a first energy storage device and a second energy storage device according to another example.

As shown in FIG. 14, a groove 411 is surrounded by a second energy storage device 410, and a first energy storage device 420 is at least partially disposed in the groove 411. The second energy storage device 410 forms a mounting structure for mounting the first energy storage device 420 so that the cost is reduced while the overall structure is compact.

Figure 15:
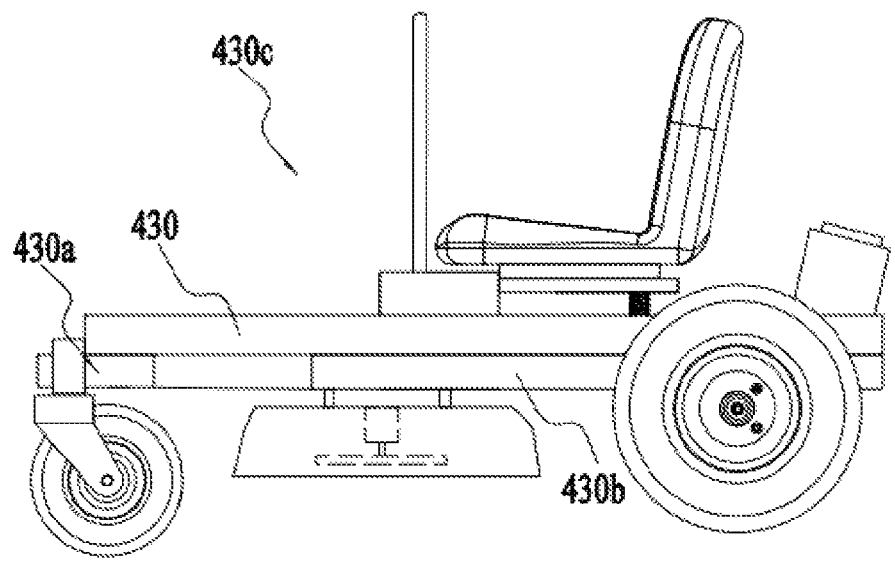
FIG. 15 is a plan view of a riding mower according to another example.

Optionally, referring to FIG. 15, a second energy storage device 430 is in the shape of a plate that is arranged along an extension direction of a main body 430a, the second energy storage device 430 is disposed inside a housing 430b, and the second energy storage device 430 and the housing 430b together form a frame or a baseplate of an outdoor moving device 430c so that the volume of the outdoor moving device 430c can be reduced and the structure of the outdoor moving device 430c is more compact.

Figure 16:
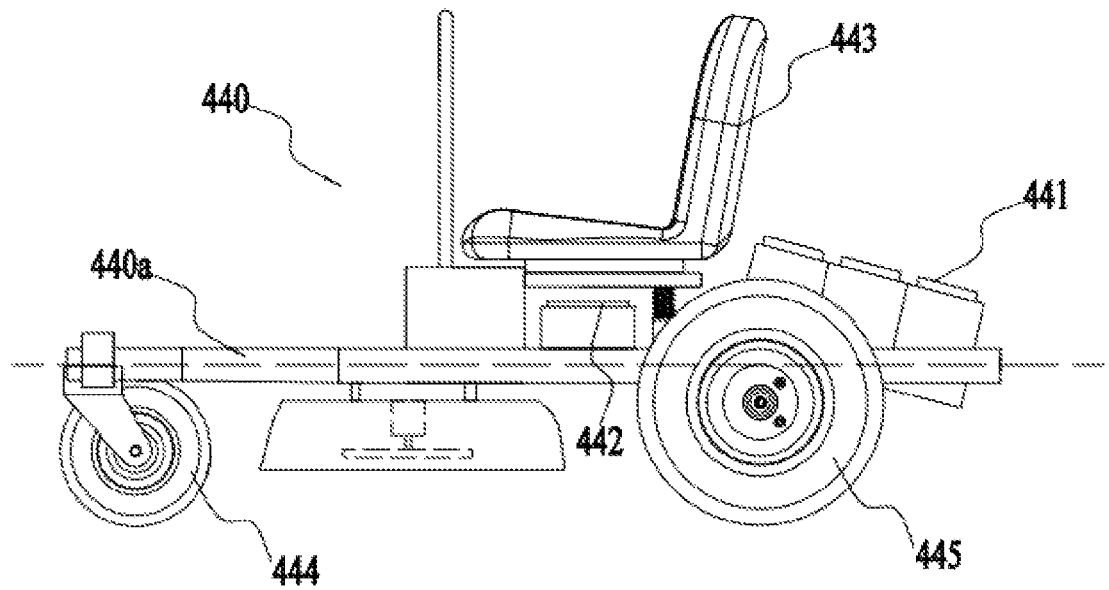
FIG. 16 is a plan view of a riding mower according to another example.

An outdoor moving device shown in FIG. 16 is a riding mower 440. A first energy storage device 441 and a second energy storage device 442 are separated from each other. The first energy storage device 441 includes a first battery pack, and the second energy storage device 442 is fixedly disposed on a lower side of a seat 443 so that a center of gravity G of the whole machine along the front and rear direction can be as close to the seat 443 and front moving wheels 444 as possible. In this manner, the problem of a cocked front end of the riding mower 440 climbing a slope can be effectively avoided; and the positive pressure of the front moving wheels 444 on the ground can be increased, thereby increasing the grip of the front moving wheels 444 and preventing the riding mower 440 from slipping on the ground. Further, particularly when a grass collecting device is disposed at a rear end of the riding mower 440, the second energy storage device 442 is disposed on the lower side of the seat 443 so that the center of gravity G of the riding mower 440 can be effectively lowered, thereby improving the stability of the whole machine. Further, the second energy storage device 442 is disposed on a front side of rear moving wheels 445.

In addition, in this example, the second energy storage device 442 may be fixedly mounted to a frame 440a of a main body, that is to say, the second energy storage device 442 cannot be quickly detached by the user without an auxiliary tool. In this manner, the second energy storage device 442 can continuously supply power to the riding mower 440, thereby avoiding the problem of a failure of the riding mower 440 to move when both the first energy storage device 441 and the second energy storage device 442 are detached by the user and cannot supply power to the riding mower 440.

It is not limited that the second energy storage device 442 is disposed on the lower side of the seat 443. In fact, any position of the second energy storage device 442 falls within the scope of the present application as long as the position of the second energy storage device 442 is different from the position of the first energy storage device 441 for reasons such as balancing performance or structural adaptation of the whole machine.

In this example, a distance between the second energy storage device 442 and the first energy storage device 441 in the front and rear direction is greater than or equal to 0 cm and less than or equal to 200 cm. Alternatively, in other examples, the distance between the second energy storage device 442 and the first energy storage device 441 in the front and rear direction is greater than or equal to 0 cm and less than or equal to 50 cm. Alternatively, in other examples, the distance between the second energy storage device 442 and the first energy storage device 441 in the front and rear direction is greater than or equal to 0 cm and less than or equal to 30 cm. The second energy storage device 442 and the first energy storage device 441 are arranged in the front and rear direction so that the center of gravity of the entire outdoor moving device can be lowered, and the outdoor moving device can move more smoothly. It is to be noted that the distance between the second energy storage device 442 and the first energy storage device 441 refers to a dimension of a gap between the second energy storage device 442 and the first energy storage device 441 in the front and rear direction.

Figure 17:
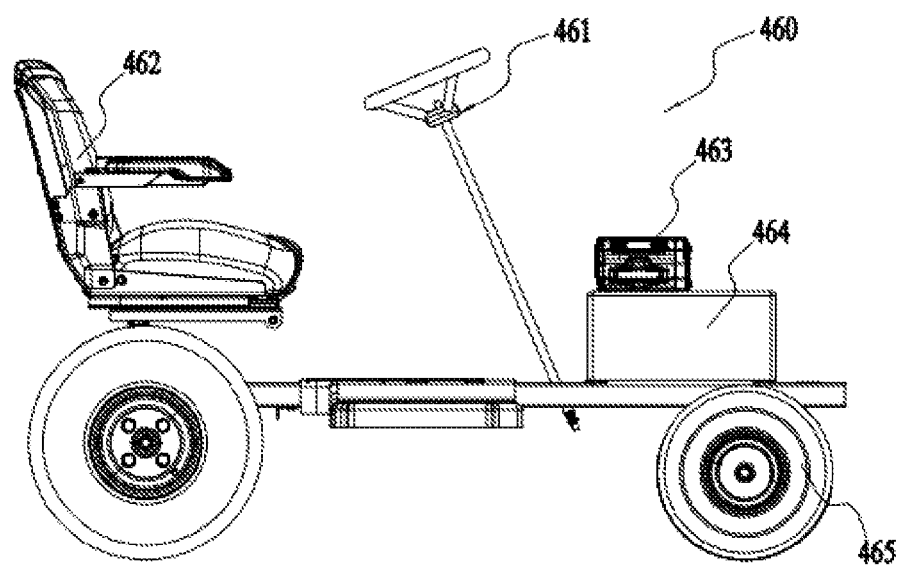
FIG. 17 is a plan view of a riding mower according to another example.

An outdoor moving device 460 shown in FIG. 17 is also a riding mower, which differs from the outdoor moving device 100 mainly in the structure of an operating assembly 461, the position of a seat 462, the position of a first energy storage device 463, and the position of a second energy storage device 464.

In this example, the seat 462 is disposed on a rear side of a main body, and the operating assembly 461 includes a steering wheel for the user to operate. Both the first energy storage device 463 and the second energy storage device 464 are disposed on a front side of the seat 462. The first energy storage device 463 is disposed on an upper side of the second energy storage device 464. A distance between the second energy storage device 464 and front moving wheels 465 in the front and rear direction is greater than or equal to 0 cm and less than or equal to 200 cm. Optionally, the first energy storage device 463 is disposed near the front moving wheels 465 and a projection of the first energy storage device 463 in the up and down direction at least partially overlaps with a projection of the front moving wheels 465 in the up and down direction. Alternatively, in other examples, the distance between the second energy storage device 464 and the front moving wheels 465 in the front and rear direction is greater than or equal to 0 cm and less than or equal to 100 cm. Alternatively, in other examples, the distance between the second energy storage device 464 and the front moving wheels 465 in the front and rear direction is greater than or equal to 0 cm and less than or equal to 50 cm. Alternatively, in other examples, the distance between the second energy storage device 464 and the front moving wheels 465 in the front and rear direction is greater than or equal to 0 cm and less than or equal to 20 cm.

Figure 18:
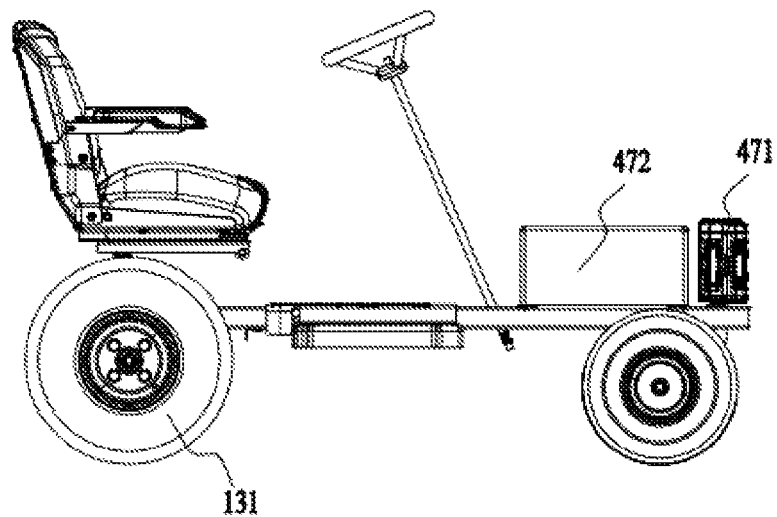
FIG. 18 is a plan view of a riding mower according to another example.

Alternatively, in an example shown in FIG. 18, a first energy storage device 471 may be disposed on a front side of a second energy storage device 472, which is convenient for the user to detach the first energy storage device 471.

Figure 19:
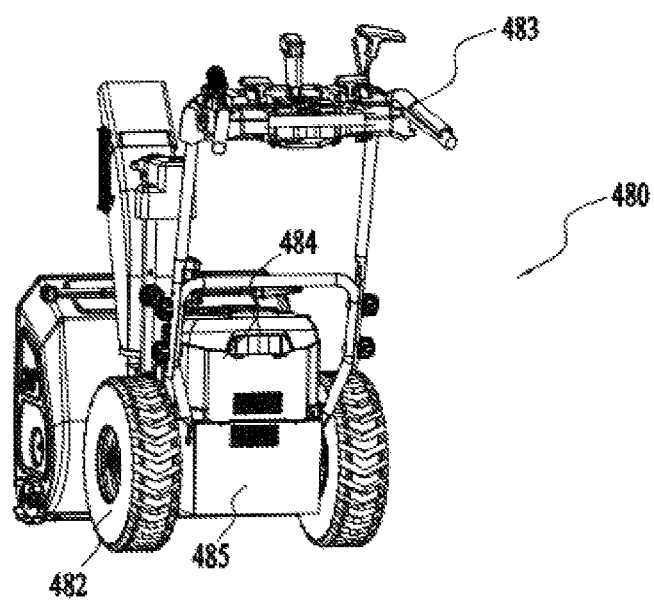
FIG. 19 is a perspective view of a snow thrower according to another example.

An outdoor moving device shown in FIG. 19 may be a snow thrower 480, where a functional assembly of the snow thrower 480 is an auger that can be driven by a drive electric motor to rotate to perform a snow throwing operation. The snow thrower 480 may be a push snow thrower, the snow thrower 480 includes moving wheels 482 and a handle 483, and the user pushes the handle 483 to drive the moving wheels 482 to rotate so that the snow thrower 480 moves. The push snow thrower 480 includes only the drive electric motor for driving the auger and is not provided with a moving electric motor for driving the moving wheels. Since the snow thrower 480 works at a relatively low temperature, optionally, the outdoor moving device further includes a heating device and/or a warming device for warming a first energy storage device 484 and/or a second energy storage device 485 included in the snow thrower 480, so as to prevent the first energy storage device 484 or the second energy storage device 485 using a specific battery material from being disturbed by a low-temperature environment to fail to operate normally.

Optionally, both the first energy storage device 484 and the second energy storage device 485 are disposed between two moving wheels 482 of the snow thrower 480 and below the handle 483. The first energy storage device 484 may be disposed above the second energy storage device 485, which is convenient for the user to plug and unplug the first energy storage device 484. A space between the handle 483 and the moving wheels 482 is made full use of so that the entire snow thrower 480 is compact, and a center of gravity of the entire snow thrower 480 is reasonable, which is convenient for the user to control the snow thrower 480 to move.

Figure 20:
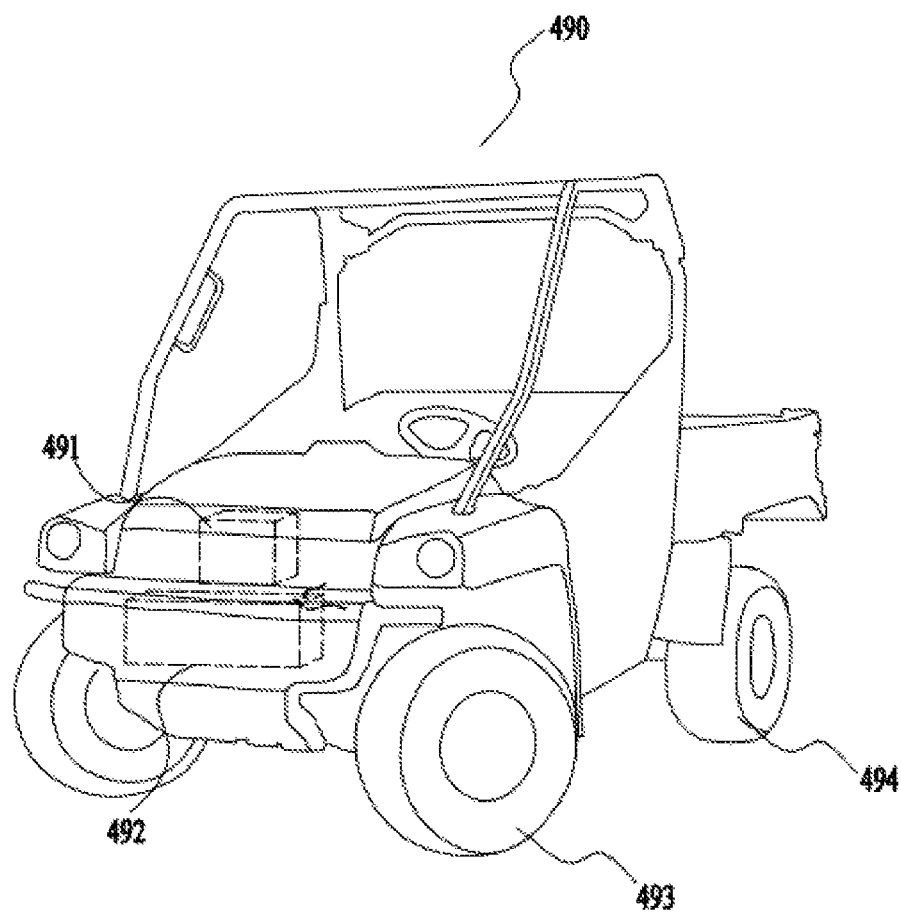
FIG. 20 is a perspective view of an all-terrain vehicle according to another example.

An outdoor moving device shown in FIG. 20 may be an all-terrain vehicle 490, and a first energy storage device 491 and a second energy storage device 492 may be disposed at a front end of a vehicle body and inside a hood. The first energy storage device 491 and the second energy storage device 492 are disposed near front moving wheels 493, and the first energy storage device 491 is disposed on an upper side of the second energy storage device 492. Optionally, the first energy storage device 491 and the second energy storage device 492 may be disposed near rear moving wheels 494.

Figure 21:
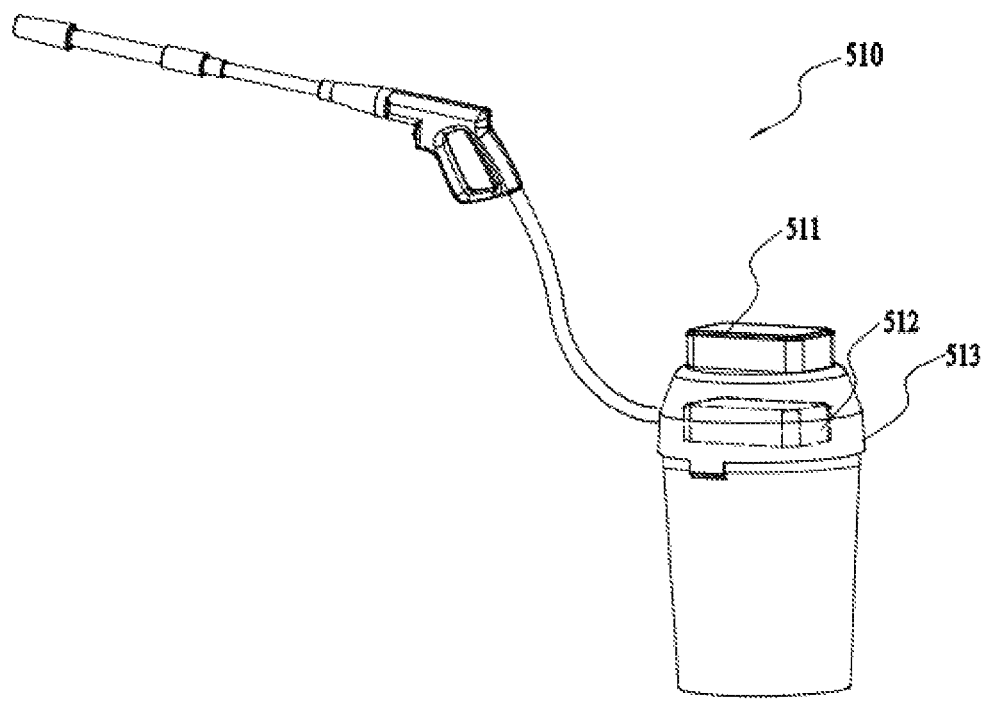
FIG. 21 is a perspective view of an outdoor tool device according to another example.

As shown in FIG. 21, the outdoor moving device may be a washer 510, where the washer 510 may include a first energy storage device 511 and a second energy storage device 512. The first energy storage device 511 is detachably mounted to a housing 513, and the second energy storage device 512 is fixedly mounted to the housing 513.

The outdoor moving device shown in FIGS. 1 to 13 further includes a mounting portion for mounting an energy storage device. The mounted energy storage device may be a lithium iron phosphate battery. To ensure that the outdoor moving device 100 can obtain the power that satisfies working requirements, total energy of the mounted energy storage device is greater than or equal to 0.5 kWh. In an example, a total capacity of the energy storage device mounted by the mounting portion may be greater than or equal to 10 Ah.

In an example, the mounting portion may include a first mounting portion 1511 for mounting or placing the first energy storage device 150 and a second mounting portion 1611 for mounting the second energy storage device 160. The first mounting portion 1511 and the second mounting portion 1611 may each be an accommodation cavity, a mounting surface, a mounting groove, or the like. In this example, the first mounting portion 1511 may be located on an upper side or a front side or a rear side of the second mounting portion 1611.

In this example, the second energy storage device 160, as a power supply device specially adapted to the outdoor moving device, has relatively large total energy that is generally greater than 0.5 kWh. The first energy storage device 150, as a power supply device adaptable to both the outdoor moving device and other power tools, has a relatively large range within which a total capacity changes. When the first energy storage device 150 has a relatively small total capacity, the first energy storage device 150 cannot support the operation of the outdoor moving device 100. When both the second energy storage device 160 and the first energy storage device 150 are mounted to the outdoor moving device 100, total energy of the second energy storage device 160 and the first energy storage device 150 is greater than 0.5 kWh so that the outdoor moving device 100 can work outdoors for a long time. However, when only one energy storage device is mounted to the outdoor moving device 100 or when two energy storage devices are mounted but one energy storage device supplies power abnormally, it needs to be ensured that the total energy of the energy storage device that can supply power normally is greater than 0.5 kWh. For example, when the first energy storage device 150 is mounted to the outdoor moving device 100 or when two energy storage devices are mounted but the second energy storage device 160 supplies power abnormally, it must be ensured that the total energy of the first energy storage device 150 is greater than 0.5 kWh, that is, a sum of energy of all the first energy storage units 151 in the first energy storage device 150 is greater than 0.5 kWh.

In an example, when the second energy storage device 160 supplies power abnormally, it must be ensured that the total capacity of the first energy storage device 150 is greater than 10 Ah, that is, a sum of capacities of all the first energy storage units 151 in the first energy storage device 150 is greater than 10 Ah. For example, if a capacity of each first energy storage unit 151 in the first energy storage device 150 is 2.5 Ah, at least five first energy storage units 151 in the first energy storage device 150 are required to ensure that the device can normally supply power to the outdoor moving device 100. In other words, only when the total capacity of the energy storage device mounted in the outdoor moving device 100 is greater than or equal to 10 Ah, can the controller allow the outdoor moving device 100 to start to move, mow grass, or perform other operations. It is to be noted that the total capacity of the first energy storage device 150 or the total capacity of the second energy storage device 160 refers to the capacity of the fully charged energy storage device.

In an example, the first energy storage device 150 includes multiple first energy storage units 151 and the second energy storage device 160 includes multiple second energy storage units 161. The second energy storage device 160 may be fixed on the housing 110 through the connection assembly, where the connection assembly may be a fastener such as a screw. While the second energy storage device 160 is fixedly connected to the housing 110, the first energy storage device 150 is detachably mounted to the housing 110, and the first energy storage device 150 is further configured to be detachable from the housing 110 to supply power to another power tool. In this example, the discharging unit 171 can control the two energy storage devices to be discharged simultaneously or separately or cyclically to supply power to the moving electric motor in the outdoor moving device 100. To adapt to the performance parameters of the second energy storage device 160 and the first energy storage device 150, a maximum discharge current at which the discharging unit 171 discharges the first energy storage device 150 is greater than or equal to 0.04 C and less than or equal to 4 C, and a maximum discharge current at which the discharging unit 171 discharges the second energy storage device 160 is greater than or equal to 0.04 C and less than or equal to 4 C. Therefore, the discharging time of the first energy storage device 150 and the second energy storage device 160 can be controlled more effectively. The maximum discharge current of the first energy storage device 150 is X C, which means that the first energy storage device 150 can be fully discharged within 1/X hour. Similarly, the maximum discharge current of the second energy storage device 160 is Y C, which means that the second energy storage device 160 can be fully discharged within 1/Y hour.

A ratio of the maximum discharge current at which the discharging unit 171 discharges the second energy storage device 160 to the maximum discharge current at which the discharging unit 171 discharges the first energy storage device 150 is greater than or equal to 0.01 and less than or equal to 10, thereby adapting to the energy characteristic settings of the second energy storage device 160 and the first energy storage device 150 and adjusting the discharging time or the discharging sequence of the second energy storage device 160 and the first energy storage device 150. Alternatively, the ratio of the maximum charge current at which the charging unit 172 charges the second energy storage device 160 to the maximum charge current at which the charging unit 172 charges the first energy storage device 150 is greater than or equal to 0.01 and less than or equal to 10. It is to be noted that the ratio of the maximum charge current at which the charging unit 172 charges the second energy storage device 160 to the maximum charge current at which the charging unit 172 charges the first energy storage device 150 refers to a ratio of the maximum charge current Y C of the second energy storage device 160 to the maximum charge current X C of the first energy storage device 150, that is, a ratio of Y to X.

When controlling the discharging unit 171 to discharge one energy storage device or two energy storage devices, the controller 175 may monitor a voltage of at least one first energy storage unit 151 or a voltage of at least one second energy storage unit 161. The controller 175 is configured to, when a discharge voltage of any first energy storage unit 151 is less than or equal to a first voltage threshold, control the discharging unit 171 to limit discharge of the first energy storage device 150. Specifically, to stop the discharge of the first energy storage device 150 is to cut off a power supply path of the first energy storage device 150 or to reduce a magnitude of the discharge current of the first energy storage device 150. For example, the discharge current of the first energy storage device 150 is gradually reduced or the first energy storage device 150 is continuously discharged at a relatively small discharge current. The controller 175 is further configured to, when a discharge voltage of any second energy storage unit 161 is less than or equal to a second voltage threshold, control the discharging unit 171 to limit discharge of the second energy storage device 160. Specifically, to stop the discharge of the second energy storage device 160 is to cut off a power supply path of the second energy storage device 160 or to reduce a magnitude of the discharge current of the second energy storage device 160. For example, the discharge current of the second energy storage device 160 is gradually reduced or the second energy storage device 160 is continuously discharged at a relatively small discharge current. The first voltage threshold is an undervoltage threshold when the first energy storage device 150 is discharged, and the second voltage threshold is an undervoltage threshold when the second energy storage device 160 is discharged. In a discharging process of each energy storage device, when the discharge voltage of the energy storage device is less than or equal to its respective undervoltage threshold, the energy storage device can no longer normally supply power.

In an optional example, both the first energy storage device 150 and the second energy storage device 160 are mounted to the outdoor moving device 100 and supply power to the outdoor moving device 100. That is, when the discharging unit 171 is in the second discharge mode, if the discharge voltage of the first energy storage device 150 is greater than the first voltage threshold, that is, when the first energy storage device 150 is in an undervoltage state, the controller 175 may limit power of the moving electric motor or limit power of the drive electric motor or limit power of the two electric motors at the same time. If the discharge voltage of the second energy storage device 160 is greater than the second voltage threshold, that is, when the second energy storage device 160 is in the undervoltage state, the controller 175 may limit the power of the moving electric motor or limit the power of the drive electric motor or limit the power of the two electric motors at the same time. Alternatively, when the two energy storage devices are both in the undervoltage state, the controller 175 may limit the power of the moving electric motor or limit the power of the drive electric motor or limit the power of the two electric motors at the same time. When the discharging unit 171 is in the first discharge mode, when the currently discharged energy storage device is in the undervoltage state, the controller 175 may limit the power of the moving electric motor or limit the power of the drive electric motor or limit the power of the two electric motors at the same time.

In an optional example, if the first energy storage device 150 is in the undervoltage state, the controller 175 may limit the discharge of the first energy storage device 150 and limit the power of the moving electric motor or limit the power of the drive electric motor or limit the power of the two electric motors at the same time. If the second energy storage device 160 is in the undervoltage state, the controller 175 may limit the discharge of the second energy storage device 160 and limit the power of the moving electric motor or limit the power of the drive electric motor or limit the power of the two electric motors at the same time. Specifically, the power of the electric motor may be limited by limiting a rotational speed or output torque of the electric motor.

In this example, a difference between the first voltage threshold and the second voltage threshold is less than or equal to 1 V so that the two energy storage devices can be adapted to more flexible discharge management and control. The first voltage threshold may be greater than or equal to the second voltage threshold or may be less than the second voltage threshold. Alternatively, the difference between the first voltage threshold and the second voltage threshold is less than or equal to 0.5 V. For example, the discharge of the first energy storage device 150 may be limited when the voltage of the first energy storage unit 151 is less than or equal to 2.5 V, and the discharge of the second energy storage device 160 may be limited when the voltage of the second energy storage unit 161 is less than or equal to 2.7 V.

The controller 175 is configured to, when half of a discharge voltage of two first energy storage units 151 is less than or equal to the first voltage threshold, control the discharging unit 171 to limit the discharge of the first energy storage device 150 or when half of a discharge voltage of two second energy storage units 161 is less than or equal to the second voltage threshold, control the discharging unit 171 to limit the discharge of the second energy storage device 160. Therefore, the effect on the discharge control performance of the inaccurate detection of the discharge voltage due to a relatively small voltage of a single energy storage unit can be avoided.

In this example, the first voltage threshold or the second voltage threshold gradually decreases as the discharge current of the first energy storage device 150 or the discharge current of the second energy storage device 160 gradually increases. In other words, the undervoltage threshold when the first energy storage device 150 is discharged is inversely proportional to the magnitude of the discharge current of the device, and the undervoltage threshold when the second energy storage device 160 is discharged is inversely proportional to the magnitude of the discharge current of the device.

In this example, the total energy of the second energy storage device 160 is greater than the total energy of the first energy storage device 150. When the remaining power of the first energy storage device 150 is insufficient, the second energy storage device 160 may charge the first energy storage device so that the platformed first energy storage device 150 can satisfy more working requirements of the user. When the discharge current of the first energy storage device 150 is greater than a first current threshold, it may be considered that the first energy storage device 150 is likely to be overdischarged and the controller 175 may limit the power supply from the first energy storage device 150. Specifically, the discharging loop of the first energy storage device 150 may be cut off or the discharge current of the first energy storage device 150 may be reduced. In this example, when the discharge current of the second energy storage device 160 is greater than a second current threshold in a discharging process, the controller 175 may control the discharging unit 171 to limit the discharge of the second energy storage device 160, for example, to reduce the discharge current of the second energy storage device 160 or cut off a discharging loop. Particularly, the first current threshold is less than or equal to the second current threshold, that is, an overcurrent protection threshold of the second energy storage device 160 is greater than or equal to an overcurrent protection threshold of the first energy storage device 150.

In this example, the first positive electrode 151a of at least one first energy storage unit 151 included in the first energy storage device 150 is made of the first material, and the second positive electrode 161a of at least one second energy storage unit 161 included in the second energy storage device 160 is made of the second material. For example, the second positive electrode 161a is made of lithium iron phosphate, and the first positive electrode 151a is made of a material containing lithium. The first material and the second material may also be selected from nickel-cadmium batteries, graphene, and other materials, so as to achieve different combinations of battery characteristics.

In this example, the controller 175 may determine, according to a Joule integral value of the discharge current of the energy storage device over a period of time, whether the energy storage device is likely to be overdischarged. The period of time is greater than or equal to 3 s and less than or equal to 120 s and may be, for example, 3 s, 5 s, 10 s, 20 s, 30 s, 40 s, 50 s, 60 s, 100 s, 120 s, or the like. For example, the controller 175 may compare a magnitude of the Joule integral value of the discharge current over 60 s with a current threshold to determine whether the corresponding energy storage device is overdischarged.

When the energy storage device is overdischarged, the controller 175 may control the discharging unit 171 to limit the discharge of the corresponding energy storage device, for example, to cut off the discharging loop or reduce the discharge current. In an optional example, when the discharge current of the energy storage device is greater than the overcurrent protection threshold of the energy storage device, the controller 175 may limit the power of the moving electric motor or limit the power of the drive electric motor or limit the power of the two electric motors at the same time. Specifically, the power of the electric motor may be limited by limiting the rotational speed or output torque of the electric motor. The power of the electric motor is output power of the electric motor.

In this example, the first material of the first positive electrode 151a of the first energy storage unit 151 is different from the second material of the second positive electrode 161a of the second energy storage unit 161, and the two types of energy storage units are in different states when reaching their full voltages in the charging process. For example, the second positive electrode 161a of the second energy storage unit 161 is made of lithium iron phosphate, and when the second energy storage unit 161 is to be fully charged, a relatively large space for change still exists, that is, the full voltage of the second energy storage unit 161 may fluctuate within a certain voltage range. For example, when the voltage of the second energy storage unit 161 reaches 3.5

V, the second energy storage unit 161 may continue being charged to 3.6 V, 3.7 V, 3.8 V 3.9 V, 4 V, 4.2 V, or the like. If the first positive electrode 151a of the first energy storage unit 151 is made of a material containing lithium element, for example, the first positive electrode 151a is made of ternary lithium, the first energy storage unit 151 cannot continue being charged after fully charged; otherwise, the energy storage device or a charger may be damaged or a safety hazard may be caused. It may be considered that when the material of the first energy storage unit 151 is determined and the first energy storage unit 151 is used or aged to a certain degree, the full voltage of the first energy storage unit 151 is a determined value.

In this example, a difference between the full voltage of the first energy storage unit 151 fully charged and the full voltage of the second energy storage unit 161 fully charged is less than or equal to 1 V. For example, the difference may be 0.5 V, 0.6 V, 0.8 V, 0.9 V, 1 V, or the like.

Figure 22:
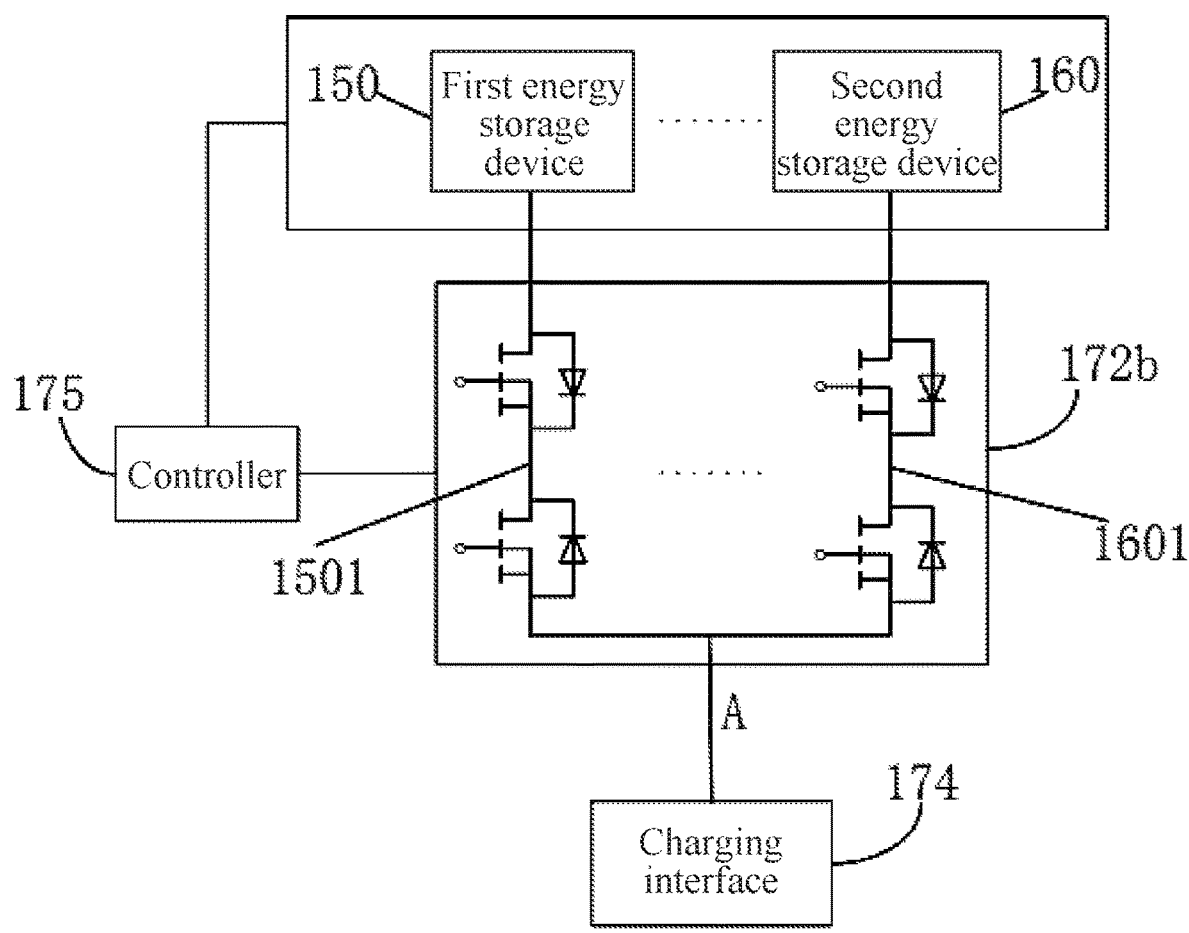
FIG. 22 is a circuit diagram in which a second energy storage device and a first energy storage device are charged.

As shown in FIG. 22, the charging unit 172 further includes a charging circuit 172b disposed between the charging interface 174 and the first energy storage device 150 and the second energy storage device 160. The charging circuit 172b may further include a charging branch for charging each energy storage device. For example, the charging circuit 172b includes a first charging branch 1501 connected to the first energy storage device 150 and a second charging branch 1601 connected to the second energy storage device 160. The charging circuit 172b is electrically connected to the controller 175, and the charging interface 174 is connected to the charging circuit 172b through a bus A. Alternating current mains or the charge current converted by an external device is transmitted to the bus A through the charging interface 174 and then transmitted to each energy storage device through the bus A. In this example, the controller 175 may control, according to detected electrical parameters of the energy storage devices, switching elements in the first charging branch 1501 and the second charging branch 1601 to change on states to charge one or more energy storage devices. Switching elements on a charging branch path are turned on in the charging process, and the switching elements on the path are turned off when charging is not performed. The electrical parameter may be a charge current or a charge voltage or temperature of the energy storage unit. For example, the controller 175 may adaptively distribute the current inputted from the bus A to the energy storage devices to charge all the energy storage devices at the same time, or the current inputted from the bus A may fully charge one energy storage device and then fully charge another energy storage device until all the energy storage devices are fully charged. In an optional example, the controller 175 may control, according to charging characteristics of different energy storage devices, the charging circuit 172b such that the energy storage devices are charged at constant currents or constant voltages or in other charging manners.

Figure 23:
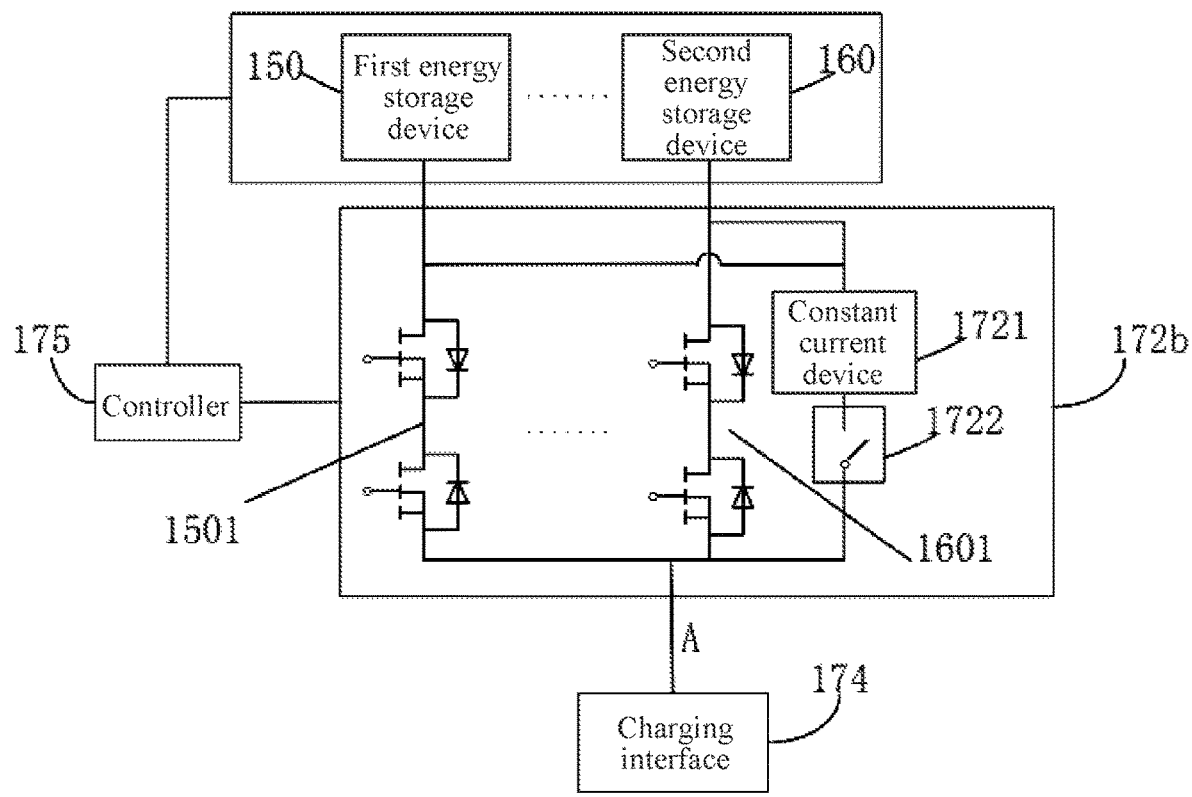
FIG. 23 is a circuit diagram for charge equalization on a second energy storage device and a first energy storage device.

Referring to FIG. 23, the charging circuit 172b further includes an equalization circuit capable of performing charge equalization on one or more energy storage devices in the charging process. For example, a constant current device 1721 and an equalization switch 1722 are disposed in the equalization circuit. The constant current device 1721 is equivalent to a constant current source capable of outputting a small current to perform the charge equalization on the basically fully charged energy storage device, that is, to perform the charge equalization on the energy storage units in the energy storage device. In this example, when one or more energy storage devices are basically fully charged and other energy storage devices are not fully charged yet, the controller 175 may turn off the charging branches of the basically fully charged energy storage devices and control the equalization switch 1722 to be turned on. In this manner, the charge current flowing in through the charging interface 174 is converted into a constant current by the constant current device 1721 and the constant current performs the charge equalization on the basically fully charged energy storage devices, and the other energy storage devices are still charged at normal charge currents. For example, when the second energy storage device 160 is basically charged to the full voltage, the controller 175 may control the second charging branch 1601 to be turned off and control the equalization circuit to be turned on, so as to perform the charge equalization on the second energy storage device 160.

In this example, the constant current outputted by the constant current device 1721 is greater than or equal to 20 mA and less than or equal to 50 mA. The normal charge current outputted from the bus A to each energy storage device for normal charging is greater than or equal to 0.1 C and less than or equal to 2 C.

In an example, a total full voltage of the second energy storage device 160 is lower than a total full voltage of the first energy storage device 150. Therefore, in the case where the first energy storage device 150 and the second energy storage device 160 are charged at the same time, the second energy storage device 160 may be fully charged earlier. Therefore, the controller 175 may control the equalization circuit to be turned on to perform the charge equalization on the second energy storage device 160 at a small current. In this example, after the at least one second energy storage unit 161 reaches the full voltage, the equalization circuit is turned on to perform the charge equalization on the second energy storage device 160.

Figure 24:
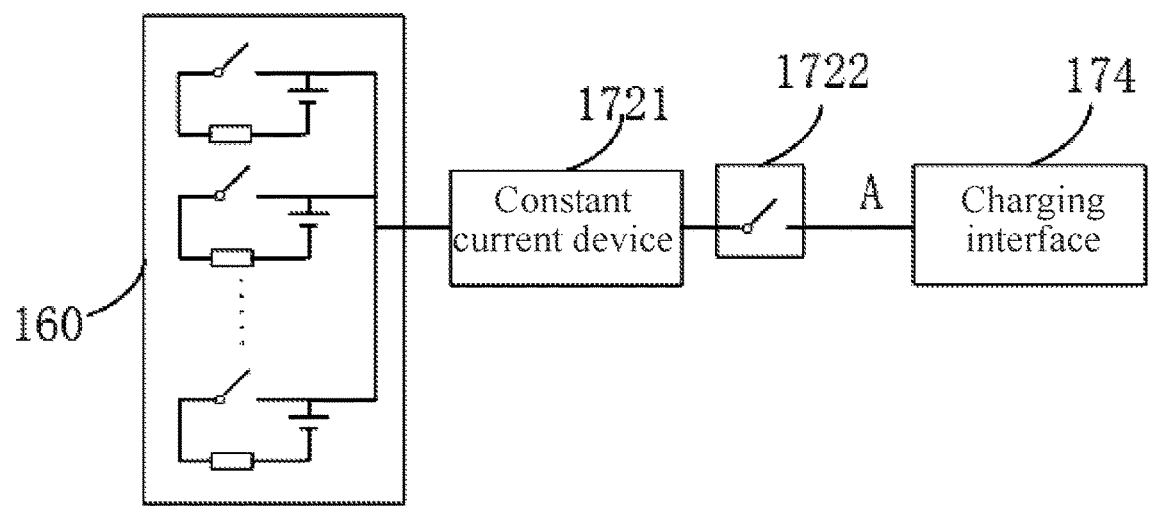
FIG. 24 is a circuit diagram for charge equalization on a second energy storage device.

In this example, as shown in FIG. 24, a charging path corresponding to each energy storage unit corresponds to one control switch, and whether to access an equalization current inputted by the constant current device 1721 can be selected through the control switch.

Figure 25:
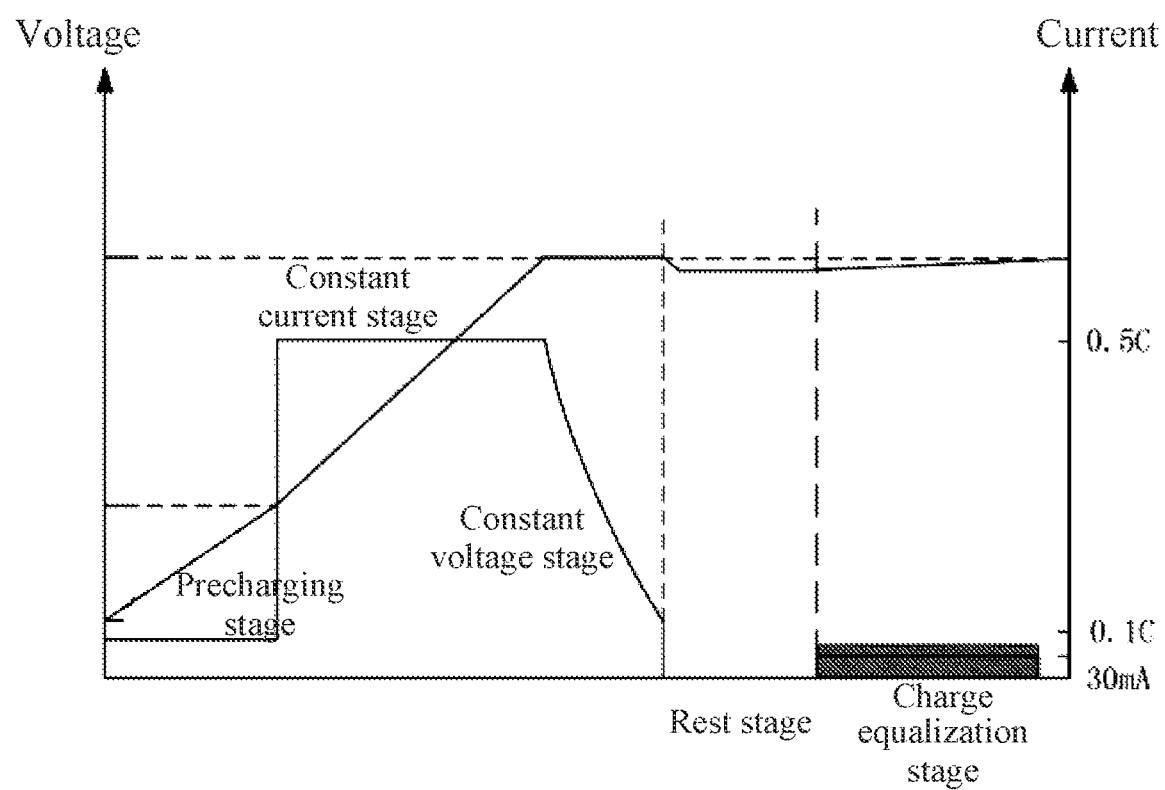
FIG. 25 is a schematic diagram of a charging stage.

As shown in FIG. 25, the charging process of any energy storage device may include a precharging stage, a constant current charging stage, and a constant voltage charging stage. The energy storage device is basically fully charged at a later stage of the constant voltage charging stage or at the end of the constant voltage charging stage. If the charge equalization is performed on the energy storage device immediately after the constant voltage charging stage ends, the energy storage unit at a charging end may have the problem of voltage divergence. To avoid the preceding problem, the controller 175 may turn off the corresponding charging branch when any energy storage device is basically fully charged or at the end of the constant voltage charging stage and turn on the equalization circuit after a preset time so as to perform the charge equalization on the energy storage device. In this example, the basically fully charged energy storage device is in a rest stage within the preset time. For example, the second energy storage device 160 may be charged and rest according to different charging stages shown in FIG. 25. At the end of the rest stage, the controller 175 may control the second charging branch 1601 to be turned off and control the equalization circuit to be turned on, so as to perform the charge equalization on the second energy storage device 160. For example, the charge current in a charge equalization stage may be 30 mA.

Figure 26:
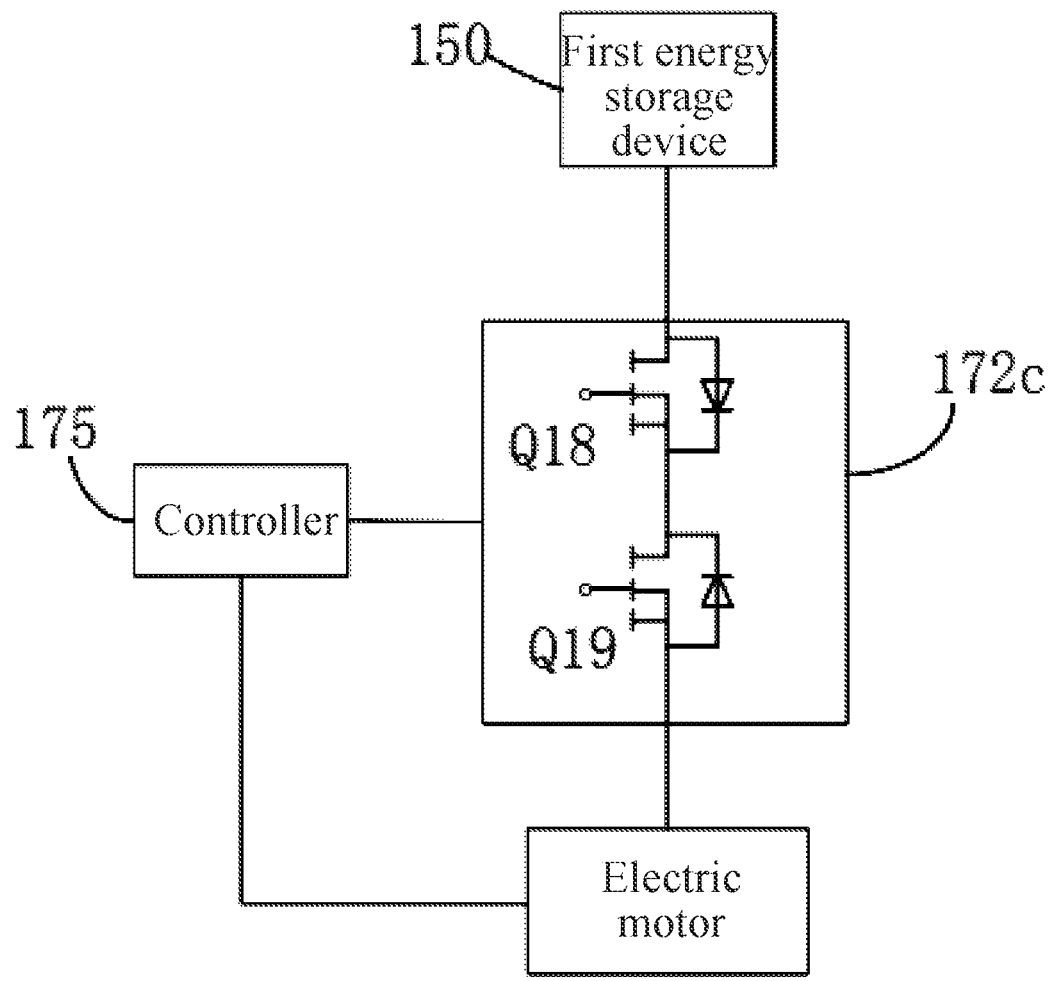
FIG. 26 is a schematic diagram for reverse charging of an outdoor moving device.

As shown in FIG. 26, the charging unit 172 may further include a charging and discharging circuit 172c, where the charging and discharging circuit 172c includes at least a charge switch Q18 and a discharge switch Q19. An end of the charging and discharging circuit 172c is connected to the first energy storage device 150 or the second energy storage device 160 or both the two energy storage devices, and the other end of the charging and discharging circuit 172c is connected to the electric motor. When the outdoor moving device 100 normally moves or mows grass, the discharge switch Q19 is turned on, the charge switch Q18 is turned off, and electrical energy flows out from the energy storage device to supply power to the electric motor. When the rotational speed of the electric motor decreases, windings of the electric motor can cut a magnetic field to generate a reverse charge current, and the charge current charges the energy storage device through the charging and discharging circuit 172c. The electric motor may include any one or both of the moving electric motor and the drive electric motor. When the rotational speed of the electric motor decreases, the outdoor moving device 100 may brake, turn, climb a slope, or perform other actions.

In an example, an end of the charging and discharging circuit 172c is connected to the first energy storage device 150 and the second energy storage device 160. When detecting that the rotational speed of the electric motor decreases, the controller 175 may detect current power or a current voltage of each of the two energy storage devices and the charge current generated by the electric motor may charge one of the energy storage devices which has lower power or a lower voltage. For example, if the power or voltage of the first energy storage device 150 is lower than the power or voltage of the second energy storage device 160, the reverse charge current generated when the rotational speed of the electric motor decreases can be transmitted to the first energy storage device 150; on the contrary, the reverse charge current can be transmitted to the second energy storage device 160.

In an example, an end of the charging and discharging circuit 172c is connected to the first energy storage device 150 and the second energy storage device 160. When detecting that the rotational speed of the electric motor decreases, the controller 175 may detect the power of the second energy storage device 160. When the power of the second energy storage device 160 is less than or equal to a power threshold, the reverse charge current generated by the deceleration of the electric motor is transmitted to the second energy storage device 160. When the power of the second energy storage device 160 is greater than the power threshold, the reverse charge current generated by the deceleration of the electric motor is transmitted to one energy storage device with a lower voltage. That is to say, when the charging and discharging circuit 172c is connected to both the first energy storage device 150 and the second energy storage device 160, when detecting that the rotational speed of the electric motor decreases, the controller 175 firstly determines, according to the power of the second energy storage device 160, whether the charge current generated by the electric motor is used for charging the second energy storage device 160. When the charge current generated by the electric motor is not necessarily used for charging the second energy storage device 160, a flow direction of the charge current is determined according to voltages of the energy storage devices. In this example, the power threshold may be 50% to 60% of full power of the second energy storage device 160. Alternatively, the power threshold may be 60% to 70% of the full power of the second energy storage device 160. Alternatively, the power threshold may be 70% to 80% of the full power of the second energy storage device 160.

The outdoor moving device 100 further includes two power supply conversion units for converting the electrical energy inputted by the first energy storage device 150 or the second energy storage device 160 to supply power to the power supply management module 170. In an optional example, part or all of circuits of a first power supply conversion unit and a second power supply conversion unit are disposed on a circuit board where the power supply management module 170 is located and the first power supply conversion unit and the second power supply conversion unit are electrically connected to the power supply management module 170 separately. In an optional example, the first power supply conversion unit and the second power supply conversion unit are independently disposed outside the circuit board where the power supply management module 170 is located and are electrically connected to the power supply management module 170 through connection lines. In an example, the power supply conversion unit may be a direct current-direct current (DC-DC) conversion unit. The two power supply conversion modules are provided so that when any power supply conversion path fails, the normal power supply from the energy storage device will not be affected.

The preceding examples of the outdoor moving device 100 may be applied to the outdoor tool devices shown in FIGS. 14 to 21

What is claimed is:

1. An outdoor moving device, comprising:
   a main body;
   a moving wheel set comprising front moving wheels and rear moving wheels that support the main body;
   a moving electric motor for driving the moving wheel set to rotate;
   a first energy storage device configured to supply power to the moving electric motor and comprising at least one first energy storage unit, the first energy storage device comprising a battery pack pluggably mounted to the main body through a battery pack interface;
   a second energy storage device configured to supply power to the moving electric motor and comprising at least one second energy storage unit; and
   a connection assembly for mounting the second energy storage device to the main body;
   wherein the first energy storage device is detachably pluggably mounted to the main body, the total energy of the second energy storage device is greater than or equal to 1 kWh and less than or equal to 30 kWh, and a distance between the second energy storage device and an axle of one of the front moving wheels or the rear moving wheels in a front and rear direction is greater than or equal to 0 cm and less than or equal to 100 cm.

2. The outdoor moving device of claim 1, wherein the first energy storage device is disposed on an upper side of the second energy storage device.

3. The outdoor moving device of claim 1, wherein the first energy storage device is disposed on a front side of the second energy storage device.

4. The outdoor moving device of claim 1, wherein the first energy storage device is disposed on a rear side of the second energy storage device.

5. The outdoor moving device of claim 1, wherein a groove is surrounded by the second energy storage device, and the first energy storage device is at least partially disposed in the groove.

6. The outdoor moving device of claim 1, wherein a distance between a center of gravity of the second energy storage device and the axle of the rear moving wheels in an up and down direction is greater than or equal to 0 cm and less than or equal to 50 cm.

7. The outdoor moving device of claim 1, wherein a distance between the second energy storage device and the first energy storage device in the front and rear direction is greater than or equal to 0 cm and less than or equal to 200 cm.

8. The outdoor moving device of claim 1, wherein an energy density of the second energy storage unit is different from an energy density of the first energy storage unit.

9. The outdoor moving device of claim 1, further comprising a functional assembly for implementing a tool function and a drive electric motor for driving the functional assembly, wherein the second energy storage device is further configured to supply power to the drive electric motor.

10. The outdoor moving device of claim 1 wherein the distance between the second energy storage device and the axle of the rear moving wheels in a front and rear direction is greater than or equal to 0 cm and less than or equal to 100 cm.

11. The outdoor moving device of claim 1, wherein the first energy storage device is disposed on an upper side of the second energy storage device.

12. The outdoor moving device of claim 1, wherein the first energy storage device is disposed on a front side of the second energy storage device.

13. An outdoor moving vehicle, comprising:
a main body;
a moving wheel set comprising front moving wheels and rear moving wheels that support the main body;
a moving electric motor for driving the moving wheel set to rotate;
a first energy storage device configured to supply power to the moving electric motor and comprising at least one first energy storage unit, the first energy storage device comprises a battery pack pluggably mounted to the main body through a battery pack interface;
a second energy storage device configured to supply power to the moving electric motor and comprising at least one second energy storage unit; and
a connection assembly for mounting the second energy storage device to the main body;
wherein the first energy storage device is detachably connected to the main body, the first energy storage unit comprises a first positive electrode made of a first material, the second energy storage unit comprises a second positive electrode made of a second material, and a distance between the second energy storage device and an axle of the rear moving wheels in a front and rear direction is greater than or equal to 0 cm and less than or equal to 100 cm.

14. An outdoor moving vehicle, comprising:
a main body;
a moving wheel set comprising front moving wheels and rear moving wheels that support the main body;
a moving electric motor for driving the moving wheel set to rotate;
a first energy storage device configured to supply power to the moving electric motor and comprising at least one first energy storage unit, the first energy storage device comprises a battery pack pluggably mounted to the main body through a battery pack interface;
a second energy storage device configured to supply power to the moving electric motor and comprising at least one second energy storage unit; and
a connection assembly for mounting the second energy storage device to the main body;
wherein the first energy storage device is detachably connected to the main body, the first energy storage unit comprises a first positive electrode made of a first material, the second energy storage unit comprises a second positive electrode made of a second material, and a distance between the second energy storage device and an axle of the front moving wheels in a front and rear direction is greater than or equal to 0 cm and less than or equal to 100 cm.

15. An outdoor moving device, comprising:
a main body;
a moving wheel set comprising moving wheels supporting the main body;
a first energy storage device configured to supply supplying power to the outdoor moving device and comprising at least one first energy storage unit, wherein the first energy storage device is detachably mounted to the main body, and the first energy storage device is further configured to be detachable from the main body to supply power to another power tool, and the first energy storage device comprises a battery pack pluggably mounted to the main body through a battery pack interface;
a second energy storage device configured to supply power to the outdoor moving device and comprising at least one second energy storage unit, wherein total energy of the second energy storage device is greater than total energy of the first energy storage device;
a charging unit connected to the second energy storage device and the first energy storage device; and
a controller for controlling the charging unit such that the second energy storage device charges the first energy storage device.

16. The outdoor moving device of claim 15, further comprising a charging interface for a connection to an external power supply, wherein the charging unit is electrically connected to the charging interface, and the controller is configured to control the charging unit such that the external power supply charges the second energy storage device through the charging interface.

17. The outdoor moving device of claim 16, wherein the controller is configured to control the charging unit such that the external power supply charges the first energy storage device through the charging interface.

18. The outdoor moving device of claim 15, further comprising a moving electric motor for driving the moving wheel set to rotate and a discharging unit, wherein the discharging unit is electrically connected to the second energy storage device and the moving electric motor so that the second energy storage device supplies power to the moving electric motor.

19. The outdoor moving device of claim 18, wherein the discharging unit is electrically connected to the first energy storage device and the moving electric motor so that the first energy storage device supplies power to the moving electric motor.

20. The outdoor moving device of claim 15, further comprising an electrical energy output port for outputting power to an external device, wherein the electrical energy output port is electrically connected to the first energy storage device or the second energy storage device.

\* \* \* \* \*